United States Patent
Poles et al.

(10) Patent No.: US 6,200,542 B1
(45) Date of Patent: *Mar. 13, 2001

(54) METHOD AND APPARATUS FOR TREATING THE ATMOSPHERE

(75) Inventors: Terence C. Poles, Ringoes, NJ (US); William G. Rosenberg; John Calcagni, both of Cary, NC (US)

(73) Assignee: Engelhard Corporation, Iselin, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/589,030

(22) Filed: Jan. 19, 1996

Related U.S. Application Data

(63) Continuation-in-part of application No. 08/412,525, filed on Mar. 29, 1995, now abandoned, and a continuation-in-part of application No. 08/537,206, filed on Sep. 29, 1995, now abandoned, which is a continuation-in-part of application No. 08/410,445, filed on Mar. 24, 1995, now abandoned, which is a continuation-in-part of application No. 08/376,332, filed on Jan. 20, 1995, now abandoned.

(51) Int. Cl.[7] ............ B01D 53/66; B01D 53/72; B01D 53/85

(52) U.S. Cl. ............ 423/210; 423/219; 423/243.3; 423/245; 423/247

(58) Field of Search ............ 423/219, 245, 423/243.3, 247, 210

(56) References Cited

U.S. PATENT DOCUMENTS

| | | |
|---|---|---|
| 1,484,782 | 2/1924 | Heise . |
| 1,628,344 | 5/1927 | Walsh . |
| 1,863,015 | 6/1932 | Kamrath . |
| 1,937,488 | 11/1933 | Jenness .................. 23/234 |
| 1,937,489 | 11/1933 | Jenness .................. 23/234 |
| 2,213,017 | 8/1940 | Perkins .................... 98/2 |
| 2,455,734 | 12/1948 | Clausen ................... 183/53 |
| 2,473,563 | 6/1949 | Beja et al. ............... 23/145 |
| 2,551,823 | 5/1951 | Buttner et al. ........... 237/28 |
| 2,658,742 | 11/1953 | Suter et al. .............. 263/3 |
| 2,701,104 | 2/1955 | Fox ........................ 241/3 |
| 2,956,860 | 10/1960 | Welsh ..................... 23/145 |

(List continued on next page.)

FOREIGN PATENT DOCUMENTS

| | | | |
|---|---|---|---|
| 40 07 965 A1 | 9/1951 | (DE) | .............. B01J/23/84 |
| 822 053 | 11/1951 | (DE) . | |
| 1067691 | 10/1959 | (DE) . | |

(List continued on next page.)

OTHER PUBLICATIONS

Derwent Abstracts (see Attached).
Manganese Compounds, vol. 15, pp. 1003–1050.
SAE 931088 Calculation and Design of Cooling Systems by Eichiseder & Raab of Steyr Damler Puchag.

(List continued on next page.)

Primary Examiner—Gary P. Straub
(74) Attorney, Agent, or Firm—Richard A. Negin

(57) ABSTRACT

Method and apparatus for treating the atmosphere to lower the concentration of pollutants therein in which ambient air is passed into operative contact with a stationary substrate such as an automobile at rest, a billboard, an air conditioning unit, a transportation tunnel and the like, the stationary substrate having at least one ambient air contacting surface having a pollutant treating composition thereon.

22 Claims, 10 Drawing Sheets

U.S. PATENT DOCUMENTS

| | | | |
|---|---|---|---|
| 2,966,339 | 12/1960 | Morgan | 257/1 |
| 3,110,300 | 11/1963 | Brown et al. | 126/109 |
| 3,147,100 | 9/1964 | Wilber | 55/419 |
| 3,242,013 | 3/1966 | Mehne et al. | 136/138 |
| 3,269,801 | 8/1966 | Boberg et al. | 23/238 |
| 3,356,452 | 12/1967 | Moore | 23/145 |
| 3,414,440 | 12/1968 | Moore | 136/107 |
| 3,565,203 | 2/1971 | Ashton et al. | 180/68 |
| 3,596,441 | 8/1971 | Luedahl | 55/376 |
| 3,640,683 | 2/1972 | Miyazaki et al. | 23/145 |
| 3,685,983 | 8/1972 | Louzos | 75/5 R |
| 3,738,088 * | 6/1973 | Colosimo | 55/104 |
| 3,770,868 | 11/1973 | Swinkels et al. | 423/50 |
| 3,823,533 | 7/1974 | Alverson et al. | 55/493 |
| 3,837,149 | 9/1974 | West et al. | 55/269 |
| 3,859,788 | 1/1975 | King et al. | 60/280 |
| 3,864,118 | 2/1975 | Schumacher et al. | 75/3 |
| 3,883,637 | 5/1975 | Benedict | 423/230 |
| 3,915,837 | 10/1975 | Feige, Jr. | 204/286 |
| 3,959,021 | 5/1976 | Nishino et al. | 136/138 |
| 3,993,597 | 11/1976 | Stiles | 252/454 |
| 4,006,217 | 2/1977 | Faber et al. | 423/605 |
| 4,007,875 | 2/1977 | Stolz et al. | 237/12.3 A |
| 4,089,928 | 5/1978 | Foroglou | 423/49 |
| 4,101,296 | 7/1978 | Lowther | 55/33 |
| 4,134,860 | 1/1979 | Hindin et al. | 252/466 |
| 4,141,963 | 2/1979 | Miller | 423/592 |
| 4,160,806 | 7/1979 | Long et al. | 422/223 |
| 4,171,211 | 10/1979 | Carter | 55/493 |
| 4,173,549 | 11/1979 | Kent et al. | 252/463 |
| 4,184,983 | 1/1980 | Putz et al. | 252/466 PT |
| 4,195,606 | 4/1980 | Wallis, Jr. et al. | 123/119 |
| 4,197,366 | 4/1980 | Tamura et al. | 429/197 |
| 4,200,609 | 4/1980 | Byrd | 422/122 |
| 4,206,083 | 6/1980 | Chang | 252/455 R |
| 4,207,291 * | 6/1980 | Byrd et al. | 422/122 |
| 4,214,867 | 7/1980 | Hunter et al. | 432/29 |
| 4,234,326 | 11/1980 | Bailey et al. | 55/278 |
| 4,246,253 | 1/1981 | Hunter | 423/605 |
| 4,261,863 | 4/1981 | Kent et al. | 252/463 |
| 4,277,360 | 7/1981 | Mellors et al. | 252/182.1 |
| 4,284,618 | 8/1981 | Van der Heyden et al. | 423/605 |
| 4,285,913 | 8/1981 | Soni et al. | 423/50 |
| 4,302,490 | 11/1981 | Byrd | 427/301 |
| 4,310,494 | 1/1982 | Welsh | 423/49 |
| 4,343,776 | 8/1982 | Carr et al. | 423/210 |
| 4,348,360 | 9/1982 | Chang et al. | 422/122 |
| 4,352,321 | 10/1982 | Fukui et al. | 98/2.11 |
| 4,363,787 | 12/1982 | Yoon | 422/201 |
| 4,379,129 * | 4/1983 | Abe | 423/210 |
| 4,379,817 | 4/1983 | Kozawa | 429/224 |
| 4,399,185 | 8/1983 | Petrow | 428/253 |
| 4,402,931 | 9/1983 | Tanabe et al. | 423/605 |
| 4,405,507 | 9/1983 | Carr et al. | 252/466 |
| 4,405,699 | 9/1983 | Kruger | 429/224 |
| 4,425,145 | 1/1984 | Reese | 55/385 B |
| 4,476,104 | 10/1984 | Mellors | 423/605 |
| 4,477,541 | 10/1984 | Fraioli | 429/33 |
| 4,483,828 | 11/1984 | Laughlin et al. | 423/49 |
| 4,485,073 | 11/1984 | Robertson et al. | 423/49 |
| 4,489,043 | 12/1984 | Bowerman et al. | 423/49 |
| 4,537,839 | 8/1985 | Cameron | 429/20 |
| 4,551,254 | 11/1985 | Imada et al. | 210/688 |
| 4,579,723 | 4/1986 | Weltmer et al. | 423/219 |
| 4,581,219 | 4/1986 | Imada et al. | 423/605 |
| 4,585,718 | 4/1986 | Uedaira et al. | 429/224 |
| 4,590,059 | 5/1986 | Mellors | 423/605 |
| 4,595,643 | 6/1986 | Koshiba et al. | 429/27 |
| 4,604,336 | 8/1986 | Nardi | 429/224 |
| 4,619,821 | 10/1986 | Ely | 423/579 |
| 4,657,887 | 4/1987 | Hardman et al. | 502/303 |
| 4,662,065 | 5/1987 | Marincic et al. | 29/623.1 |
| 4,665,973 | 5/1987 | Limberg et al. | 165/133 |
| 4,666,677 | 5/1987 | Ramus et al. | 422/183 |
| 4,670,474 | 6/1987 | Hinnenkamp et al. | 518/713 |
| 4,684,381 | 8/1987 | Wasylyniuk | 55/316 |
| 4,714,694 | 12/1987 | Wan et al. | 502/304 |
| 4,733,605 | 3/1988 | Hölter et al. | 98/2.11 |
| 4,734,113 | 3/1988 | Takagi et al. | 55/504 |
| 4,738,947 | 4/1988 | Wan et al. | 502/304 |
| 4,742,038 | 5/1988 | Matsumoto | 502/303 |
| 4,818,354 | 4/1989 | Preisler et al. | 204/96 |
| 4,824,363 | 4/1989 | Abthoff et al. | 432/222 |
| 4,838,910 | 6/1989 | Stollenwerk et al. | 55/385.2 |
| 4,871,709 | 10/1989 | Tatsushima et al. | 502/324 |
| 4,909,815 * | 3/1990 | Meyer | 55/316 |
| 4,921,689 | 5/1990 | Walker et al. | 423/605 |
| 4,961,762 | 10/1990 | Howeth | 55/302 |
| 4,975,346 | 12/1990 | Lecerf et al. | 429/197 |
| 5,004,487 | 4/1991 | Kowalczyk | 55/269 |
| 5,010,051 | 4/1991 | Rudy | 502/304 |
| 5,057,483 | 10/1991 | Wan | 502/304 |
| 5,080,882 * | 1/1992 | Yoshimoto et al. | 423/579 |
| 5,082,570 | 1/1992 | Higgins et al. | 210/683 |
| 5,085,266 | 2/1992 | Arold et al. | 165/1 |
| 5,092,396 | 3/1992 | Murano et al. | 165/119 |
| 5,113,836 | 5/1992 | Sweeten | 123/573 |
| 5,130,109 | 7/1992 | Wan | 423/213.2 |
| 5,139,992 | 8/1992 | Tauster et al. | 502/304 |
| 5,142,864 | 9/1992 | Dunne | 60/274 |
| 5,145,657 | 9/1992 | Kobayashi et al. | 423/219 |
| 5,145,822 * | 9/1992 | Falke et al. | 502/150 |
| 5,145,825 | 9/1992 | Deeba et al. | 502/242 |
| 5,147,429 * | 9/1992 | Bartholomew et al. | 55/356 |
| 5,160,586 * | 11/1992 | Yoshimoto et al. | 204/59 |
| 5,162,274 | 11/1992 | Deitz | 502/51 |
| 5,176,833 | 1/1993 | Vaughn et al. | 210/638 |
| 5,180,502 | 1/1993 | Nishiki et al. | 210/748 |
| 5,187,137 | 2/1993 | Terui et al. | 502/241 |
| 5,194,233 | 3/1993 | Kitahara et al. | 423/210 |
| 5,212,140 | 5/1993 | Yoshimoto et al. | 502/300 |
| 5,214,014 | 5/1993 | Yoshimoto et al. | 502/84 |
| 5,221,649 | 6/1993 | Yoshimoto et al. | 502/84 |
| 5,221,652 | 6/1993 | Tierney et al. | 502/170 |
| 5,227,144 | 7/1993 | Perez de la Garza | 423/210 |
| 5,232,882 | 8/1993 | Yoshimoto et al. | 502/5 |
| 5,232,886 | 8/1993 | Yoshimoto et al. | 502/84 |
| 5,250,487 | 10/1993 | Wirtz et al. | 502/243 |
| 5,252,299 | 10/1993 | Retallick | 422/174 |
| 5,262,129 | 11/1993 | Terada et al. | 422/122 |
| 5,277,890 | 1/1994 | Wang et al. | 423/605 |
| 5,283,041 | 2/1994 | Nguyen et al. | 423/240 |
| 5,283,139 | 2/1994 | Newman et al. | 429/224 |
| 5,294,499 | 3/1994 | Furukawa et al. | 249/164 |
| 5,296,435 | 3/1994 | Kitaguchi et al. | 502/174 |
| 5,308,591 | 5/1994 | Whittenberger | 422/174 |
| 5,317,869 | 6/1994 | Takeuchi | 60/300 |
| 5,340,562 | 8/1994 | O'Young et al. | 423/599 |
| 5,348,726 | 9/1994 | Wang et al. | 423/605 |
| 5,356,457 | 10/1994 | Alvarz et al. | 75/710 |
| 5,382,417 | 1/1995 | Haase | 423/219 |
| 5,391,365 | 2/1995 | Wang et al. | 423/605 |
| 5,395,534 | 3/1995 | Smith | 210/688 |
| 5,401,477 | 3/1995 | Cawlfield et al. | 423/50 |
| 5,405,594 | 4/1995 | Anderson et al. | 423/605 |
| 5,411,643 | 5/1995 | Cawlfield et al. | 204/115 |
| 5,419,882 | 5/1995 | Jibiki | 423/111 |
| 5,422,331 * | 6/1995 | Galligan et al. | 502/333 |
| 5,433,772 | 7/1995 | Sikora | 96/87 |
| 5,447,693 | 9/1995 | Ohat et al. | 422/122 |
| 5,620,672 | 4/1997 | Galligan et el. | 423/219 |

| | | | |
|---|---|---|---|
| 5,676,913 | 10/1997 | Cirillo et al. | 423/219 |

FOREIGN PATENT DOCUMENTS

| | | | |
|---|---|---|---|
| 1095128 | 12/1960 | (DE) | . |
| 1101160 | 3/1961 | (DE) | . |
| 1133154 | 7/1962 | (DE) | . |
| 21 55 738 | 5/1973 | (DE) | B60H/3/06 |
| 25 49 621 A1 | 5/1977 | (DE) | H01M/4/90 |
| 25 49 621 B2 | 5/1977 | (DE) | . |
| 30 19 828 | 11/1980 | (DE) | C09D/7/12 |
| 30 19 828 A1 | 11/1980 | (DE) | C09D/7/12 |
| 4007965 * | 9/1981 | (DE) | . |
| 33 34 992 A1 | 4/1985 | (DE) | B60H/3/00 |
| 37 13 035 A1 | 10/1988 | (DE) | B65D/90/28 |
| 40 17 892 A1 | 5/1991 | (DE) | B01J/23/89 |
| 40 07 964 A 1 | 9/1991 | (DE) | B01J/23/72 |
| 40 07 964 A1 | 9/1991 | (DE) | B01J/23/72 |
| 40 07 965 A 1 | 9/1991 | (DE) | B01J/23/84 |
| 40 07 965 A1 | 9/1991 | (DE) | B01J/23/84 |
| 40 07 965 C2 | 9/1991 | (DE) | B01J/23/72 |
| 4017892 * | 12/1991 | (DE) | 423/219 |
| 42 09 196 C1 | 7/1993 | (DE) | . |
| 42 09 198 C1 | 7/1993 | (DE) | . |
| 40 07 965 C2 | 3/1994 | (DE) | . |
| 43 18 738 C 1 | 7/1994 | (DE) | B01D/53/36 |
| 43 18 738 C1 | 7/1994 | (DE) | B01D/53/36 |
| 44 20 224 A1 | 1/1995 | (DE) | B01D/53/86 |
| 44 23 329 A1 | 1/1995 | (DE) | B01D/53/86 |
| 94 15 457 | 1/1995 | (DE) | B01D/53/86 |
| 0 097 287 B1 | 1/1984 | (EP) | F28D/1/04 |
| 097 287 | 1/1984 | (EP) | F28D/1/04 |
| 097 287 A2 | 1/1984 | (EP) | F28D/1/04 |
| 0 186 477 B1 | 7/1986 | (EP) | F24F/3/12 |
| 186 477 A2 | 7/1986 | (EP) | F24F/3/12 |
| 351 036 | 1/1990 | (EP) | B01J/35/02 |
| 351 036 A1 | 1/1990 | (EP) | B01J/35/02 |
| 373 648 A2 | 6/1990 | (EP) | B01D/53/36 |
| 0 431 648 A1 | 6/1991 | (EP) | . |
| 470 330 A1 | 2/1992 | (EP) | F02M/35/024 |
| 537 815 A1 | 4/1993 | (EP) | C10G/47/14 |
| 0 561 484 A1 | 9/1993 | (EP) | B01D/53/36 |
| 0 628 338 A1 | 12/1994 | (EP) | . |
| 0 634 205 A1 | 1/1995 | (EP) | . |
| 0 635 685 A1 | 1/1995 | (EP) | . |
| 0 653 956 B1 | 5/1995 | (EP) | B01D/53/66 |
| 0 666 776 B1 | 8/1995 | (EP) | B01J/35/04 |
| 2 009 392 | 6/1979 | (GB) | F24F/7/06 |
| 2056424 * | 2/1981 | (GB) | 423/219 |
| 2 056 424 | 3/1981 | (GB) | B01D/53/36 |
| 2 037 607 B | 5/1983 | (GB) | . |
| 2 110 174 | 6/1983 | (GB) | B60K/13/02 |
| 2 218 354 | 11/1989 | (GB) | B01D/50/00 |
| 74011141-B | 3/1974 | (JP) | . |
| 52 148 468 | 12/1977 | (JP) | B01D/53/34 |
| 52148468 | 12/1977 | (JP) | B01D/53/34 |
| 55106813 | 8/1980 | (JP) | B60H/1/24 |
| 55 106 813 | 10/1980 | (JP) | B60H/1/24 |
| 56 059 671 | 5/1981 | (JP) | B01J/20/06 |
| 56059671 | 5/1981 | (JP) | B01J/20/06 |
| 57 122 924 | 7/1982 | (JP) | B01D/53/36 |
| 61 035 853 | 2/1986 | (JP) | B01D/53/36 |
| 61035853 | 2/1986 | (JP) | B01J/23/89 |
| 3-229645 | 3/1991 | (JP) | . |
| 41 10 045 | 4/1992 | (JP) | B01D/53/36 |
| 4-176316 | 6/1992 | (JP) | . |
| 4-297341 | 10/1992 | (JP) | . |
| 42 97 341 | 10/1992 | (JP) | B60P/3/00 |
| 405007776 | 1/1993 | (JP) | B01J/23/64 |
| 5--7776 * | 1/1993 | (JP) | 423/219 |
| 50 23 590 | 2/1993 | (JP) | B01D/53/36 |
| 50 38 443 | 2/1993 | (JP) | B01D/53/36 |
| 5038443 | 2/1993 | (JP) | B01J/23/89 |
| 6-13204 | 1/1994 | (JP) | . |
| 1 703 173 A1 | 1/1992 | (SU) | B01J/29/12 |
| WO 91/09755-A | 7/1911 | (WO) | . |
| WO90/11433 | 10/1990 | (WO) | F01N/3/10 |
| WO93/05821 | 4/1993 | (WO) | A61L/9/20 |
| WO 94/27709 | 12/1994 | (WO) | . |
| WO 95/22395 | 8/1995 | (WO) | B01D/53/75 |
| WO 96/09109 | 3/1996 | (WO) | B01D/53/88 |
| WO96/09109 | 3/1996 | (WO) | B01D/53/86 |
| WO 96/22146 | 7/1996 | (WO) | B01D/53/68 |
| WO 96/22148 | 7/1996 | (WO) | B01D/53/88 |
| WO 97/41948 | 11/1997 | (WO) | B01D/53/86 |
| WO 98/06479 | 2/1998 | (WO) | B01D/53/86 |
| WO 98/06480 | 2/1998 | (WO) | B01D/53/86 |

OTHER PUBLICATIONS

SAE 931089 Charge Air Cooler for Passenger Cars by Thierry Collette of Valeo Thermique Moteur.

SAE 931092 State of the Art & Future Developments of Aluminum Radiators for Cars & Trucks by Josef Kern & Jochen Eitel of Behr GmbH & Co.

SAE 931112 Air Mix versus Coolant Flow to Control Discharge Air Temperature in Vehicle Heating and Air Conditioning Systems by Gary Rolling and Robert Cummings of Behr of America, Inc. and Gebhard Schweizer of Behr GmbH & Co.

SAE 931115 Engine Cooling Module Development Using Air Flow Management Technique by Refki–El–Bourini & Samuel Chen of Calsonic Technical Center.

SAE 931120 A New Zeolite Energy Storage Concept for Cooling & Heating Sleeping Cabins in Trucks by Manfred Nonnenman & Noureddine Khellifa of Behr GmbH & Co.

SAE 931121 Automotive Evaporator and Condenser Modeling by Francisco Castro, Francisco Tinaut & A.A. Rahman Ali of Universidad de Valladolid.

SAE 931125 Durability Concerns of Aluminum Air to Air Charge Air Coolers by Paul Richard Smith of Valeo Engine Cooling, Inc.

Additives for Dispersion Technology, published by Rhone Poulenc.

Bosch Automotive Handbook, Second Edition, pp. 301–303, 320 and 349–351 published by Robert Bosch GmbH, 1986.

The MIT Press, 1985 at pp. 304–306 for radiator and fin design; and p. 392 for after coolers.

Outside submission from Litman Law Offices, Ltd. In the Application of Leo K. Brown for an Environmental Air Filtration System for Vehicles.

Outside submission from Attorney Conrad O. Gardner in the Application of A System for Ambient Air Pollution Processing by Motor Vehicles.

Newspaper Article with Informal Translation—Mobile Air Purification.

Newspaper Article with Informal Translation—Super–Kat in Cars ensures clean air forever.

McKenzie, The Synthesis of Birnessite, Cryptomelane, and Some Other Oxides and Hydroxides of Manganese, Mineralogical Magazine, Dec. 1971, vol. 38, pp. 493–502.

* cited by examiner

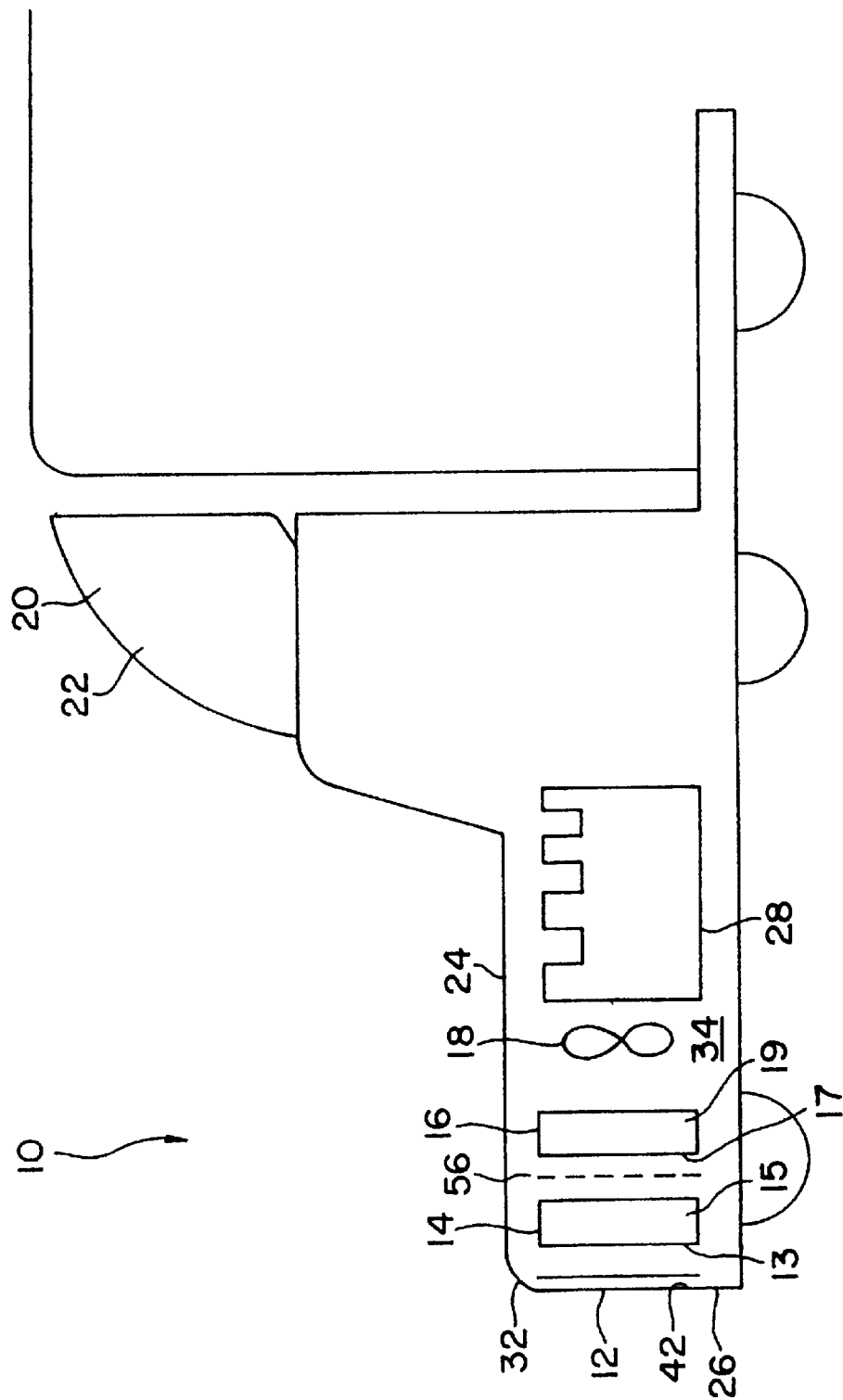

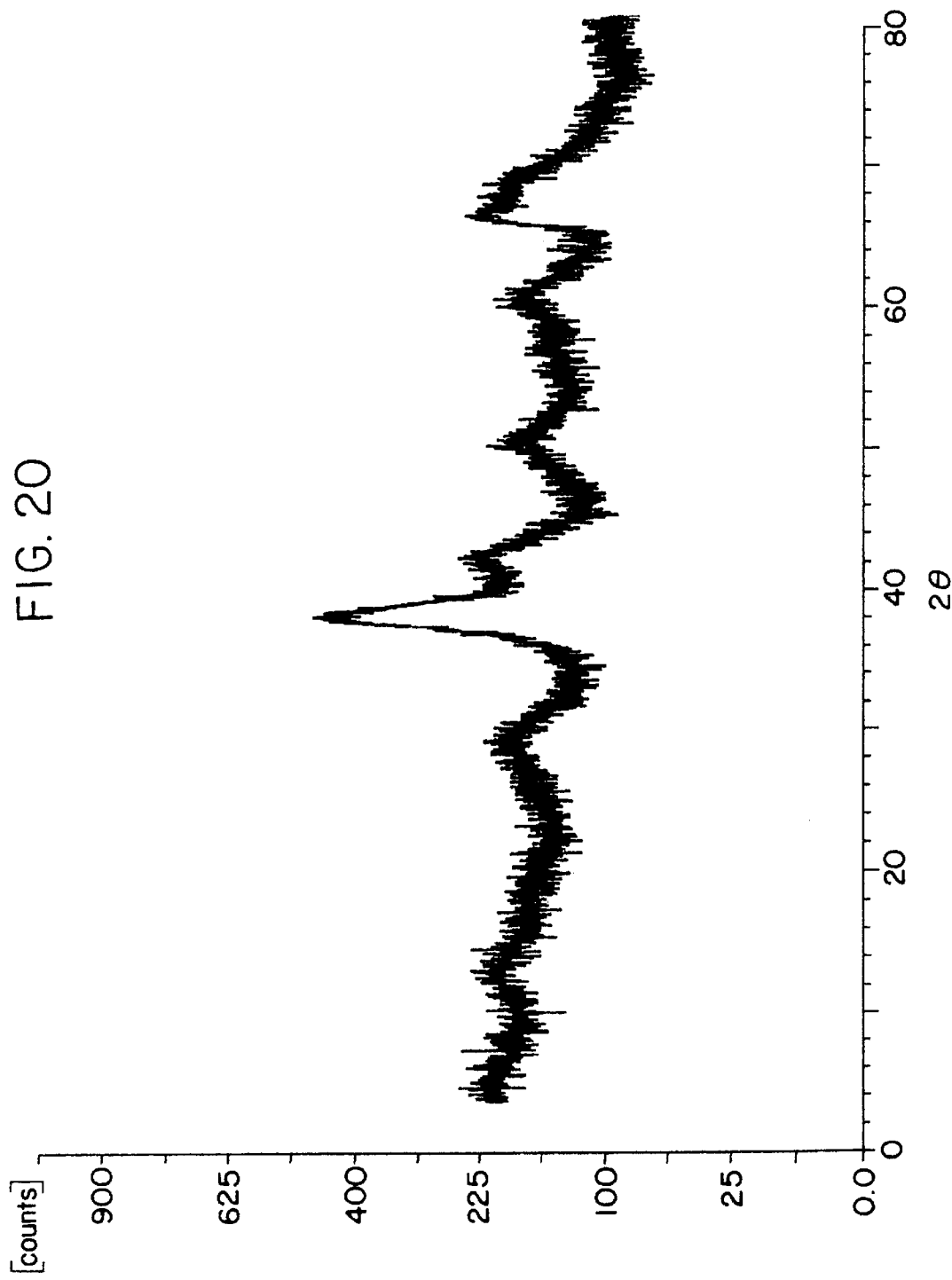

METHOD AND APPARATUS FOR TREATING THE ATMOSPHERE

RELATED APPLICATIONS

This is a continuation-in-part of U.S. Ser. No. 08/412,525 filed Mar. 29, 1995 abandoned; and a continuation-in-part application of U.S. Ser. No. 08/537,206 abandoned filed Sep. 29, 1995 which is a continuation-in-part application of U.S. Ser. No. 08/410,445 abandoned filed on Mar. 24, 1995 bearing attorney docket no. 3777A which is a continuation-in-part application of U.S. Ser. No. 08/376,332 abandoned filed on Jan. 20, 1995, all of said applications herein incorporated by reference.

BACKGROUND OF THE INVENTION

1. Field of the Invention

The present invention relates to a method and apparatus for cleaning the atmosphere; and more particularly to a stationary substrate such as a stationary motor vehicle comprising at least one atmosphere contacting surface having a pollution treating composition thereon.

2. Discussion of the Related Art

A review of literature relating to pollution control reveals that the general approach is to reactively clean waste streams entering the environment. If too much of one pollutant or another is detected or being discharged, the tendency has been to focus on the source of the pollutant, the cause of the pollutant or the waste stream containing the pollutant. For the most part gaseous streams are treated to reduce the pollutants prior to entering the atmosphere.

It has been disclosed to treat atmospheric air directed into a confined space to remove undesirable components therein.

However, there has been little effort to treat pollutants which are already in the environment; the environment has been left to its own self cleansing systems.

References are known which disclose proactively cleaning the environment. U.S. Pat. No. 3,738,088 discloses an air filtering assembly for cleaning pollution from the ambient air by utilizing a vehicle as a mobile cleaning device. A variety of elements are disclosed to be used in combination with a vehicle to clean the ambient air as the vehicle is driven through the environment. In particular, there is disclosed ducting to control air stream velocity and direct the air to various filter means. The filter means can include filters and electronic precipitators. Catalyzed postfilters are disclosed to be useful to treat nonparticulate or aerosol pollution such as carbon monoxide, unburned hydrocarbons, nitrous oxide and/or sulfur oxides, and the like.

Another approach is disclosed in U.S. Pat. No. 5,147,429. There is disclosed a mobile airborne air cleaning station. In particular this patent features a dirigible for collecting air. The dirigible has a plurality of different types of air cleaning devices contained therein. The air cleaning devices disclosed include wet scrubbers, filtration machines, and cyclonic spray scrubbers.

The difficulty with devices disclosed to proactively clean the atmospheric air is that they require new and additional equipment. Even the modified vehicle disclosed in U.S. Pat. No. 3,738,088 requires ducting and filters which can include catalytic filters.

DE 40 07 965 C2 to Klaus Hager discloses a catalyst comprising copper oxides for converting ozone and a mixture of copper oxides and manganese oxides for converting carbon monoxide. The catalyst can be applied as a coating to a self heating radiator, oil coolers or charged-air coolers. The catalyst coating comprises heat resistant binders which are also gas permeable. It is indicated that the copper oxides and manganese oxides are widely used in gas mask filters and have the disadvantage of being poisoned by water vapor. However, the heating of the surfaces of the automobile during operation evaporates the water. In this way, continuous use of the catalyst is possible since no drying agent is necessary.

Responsive to the difficulties associated with devices for proactively treating the atmosphere, the Assignee herein in U.S. Patent application Ser. No. 09/589,182 filed on Jan. 19, 1996, bearing attorney docket no. 3777C, incorporated herein by reference, disclosed apparatus and related methods for treating the atmosphere by employing a moving vehicle. In preferred embodiments a portion of the cooling system (e.g. the radiator) is coated with a catalytic or adsorption composition. Additionally, a fan associated with the cooling system can operate to draw or force air into operative contact with the radiator. Pollutants contained within the air such as ozone and/or carbon monoxide and/or hydrocarbons are then converted to non-polluting compounds (e.g. oxygen gas, carbon dioxide and water).

While this system is effective for reducing or eliminating pollution by the use of moving vehicles, it should be noted that only about 10% of all motor vehicles are moving during peak pollution periods, typically from about noon to 6 p.m. for ozone. Ozone is generated in highest concentrations during the hottest part of the day. In large cities such as Los Angeles, New York and the like the afternoon hours represent the periods of highest ozone concentration. Yet if only 10% of all motor vehicles are moving during this period of time, then the remaining 90% of the motor vehicles are idle and cannot avail themselves of the pollution eliminating benefits described in U.S. patent application Ser. No. 09/589,182 filed on Jan. 19, 1996 bearing attorney docket no. 3777C.

It would therefore be a significant advance in the art of treating the atmosphere to remove pollutants if stationary devices such as billboards, air conditioners, non-moving motor vehicles and the like equipped with a pollution removing composition, can be used to treat air to remove pollutants therefrom. In particular, it would be of significant benefit to employ the tremendous numbers of idle motor vehicles as air treating devices to reduce pollution and smog, particularly in large cities.

SUMMARY OF THE INVENTION

The present invention relates to an apparatus and method to treat the atmosphere to remove pollutants therefrom. The term "atmosphere" is defined herein as the mass of air surrounding the earth. The term "ambient air" shall mean the atmosphere which is drawn or forced towards the substrate. It is intended to include air which has been heated either incidentally or by a heating means.

The present invention is generally directed to a method for treating the atmosphere comprising passing ambient air over a stationary substrate having at least one air contacting surface having a pollutant treating composition thereon. The stationary substrate is any substrate that can be modified by coating, for example, to contain the pollutant treating composition. In a preferred form of the invention, the stationary substrate is associated with a motor vehicle at rest with the engine shut off.

The ambient air is drawn over the substrate by natural wind currents or preferably by the use of an air drawing means such as a fan or the like to draw or force ambient air into operative contact with the substrate having the pollution treating composition thereon. By way of example, the fan may be positioned in a tunnel, or as part of an air conditioning system or a fan, preferably in motor vehicles a standard fan, used in a conventional cooling system of a motor vehicle. The fan is typically operated by a power source such as a battery, preferably the conventional 12 volt battery used in a motor vehicle, solar panel and the like.

The present invention is devised to operate in response to the presence of pollutants in the atmosphere. Accordingly, the present invention may be provided with a sensor adapted to detect levels of selected pollutants such as ozone. At various locations, such as certain urban areas (i.e. Los Angeles) one pollutant, ozone, is present at peak levels during the early afternoon hours (i.e. noon to 6 p.m.).

Alternatively, the fan or other air drawing or forced air device may be activated once the temperature of the ambient air reaches a predetermined minimum level (e.g. 85° F.). Temperature may be used as an indication of the presence of ozone. This is because it is known that on hot days, the level of ozone is at its highest. Accordingly, a temperature sensor may be used to activate the power source when the temperature reaches a predetermined minimum (e.g. 85° F.).

If the power source is drained or cannot sustain the voltage necessary to drive the air drawing device without interfering with the power source's ability to start the vehicle, it is desirable to override the system. In this way, the air drawing device is not activated or is deactivated even if the ambient air contains the minimum concentration of pollutants and/or is at the minimum required temperature. Accordingly, the present invention can be provided with a power level detecting device or sensor which detects the level of power available from the power source and compares the available power with a predetermined power level sufficient to operate the air drawing device and allow easy starting of the vehicle.

In another aspect of the present invention there may be provided a timing device which serves to activate the air drawing device for a preselected amount of time and/or a predetermined period of time when the vehicle is not in operation. It should be understood that the system of the present invention is deactivated when the engine of a motor vehicle is operating.

The present invention is also applicable to conditions where the ambient air is heated by a heater or by incidental contact with a heated object such as a motor vehicle radiator or engine which has not yet cooled to ambient temperatures or by other means such as a heat exchanger. Elevating the temperature of the ambient air makes it possible to convert additional pollutants (e.g. carbon monoxide) to non-polluting compounds (e.g. carbon dioxide).

The present invention is directed to compositions, methods and articles to treat pollutants in air. Such pollutants may typically comprise from 0 to 400 parts, more typically 1 to 300, and yet more typically 1 to 200, parts per billion (ppb) ozone;

0 to 30 parts, and more typically 1 to 20, parts per million (ppm) carbon monoxide; and 2 to 3000 ppb unsaturated hydrocarbon compounds such as $C_2$ to about $C_{20}$ olefins and partially oxygenated hydrocarbons such as alcohols, aldehydes, esters, ethers, ketones and the like. Typical hydrocarbons which can be treated include, but are not limited to, propylene, butylene, formaldehyde and other airborne hydrocarbon gases and vapors. Other pollutants present may include nitrogen oxides and sulfur oxides. The National Ambient Air Quality Standard for ozone is 120 ppb, and for carbon monoxide is 9 ppm.

Pollutant treating compositions include catalyst compositions useful for catalyzing the conversion of pollutants present in the atmosphere to non-objectionable materials. Alternatively, adsorption compositions can be used as the pollutant treating composition to adsorb pollutants which can be destroyed upon adsorption, or stored for further treatment at a later time.

Catalyst compositions can be used which can assist in the conversion of the pollutants to harmless compounds or to less harmful compounds. Useful and preferred catalyst compositions include compositions which catalyze the reaction of ozone to form oxygen, catalyze the reaction of carbon monoxide to form carbon dioxide, and/or catalyze the reaction of hydrocarbons to form water and carbon dioxide. Specific and preferred catalysts to catalyze the reaction of hydrocarbons are useful for catalyzing the reaction of low molecular weight unsaturated hydrocarbons having from two to twenty carbons and at least one double bond, such as $C_2$ to about $C_8$ mono-olefins. Such low molecular weight hydrocarbons have been identified as being sufficiently reactive to cause smog. Particular olefins which can be reacted include propylene and butylene. A useful and preferred catalyst can catalyze the reactions of both ozone and carbon monoxide; and preferably ozone, carbon monoxide and hydrocarbons.

Ozone—Useful and preferred catalyst compositions to treat ozone include a composition comprising manganese compounds including oxides such as $Mn_2O_3$ and $MnO_2$ with a preferred composition comprising $\alpha$-$MnO_2$, and cryptomelane being most preferred. Other useful and preferred compositions include a mixture of $MnO_2$ and CuO. Specific and preferred compositions comprise hopcalite which contains CuO and $MnO_2$ and, more preferably Carulite® which contains $MnO_2$, CuO and $Al_2O_3$ and sold by the Carus Chemical Co. An alternative composition comprises a refractory metal oxide support on which is dispersed a catalytically effective amount of a palladium component and preferably also includes a manganese component. Also useful is a catalyst comprising a precious metal component, preferably a platinum component on a support of coprecipitated zirconia and manganese oxide. The use of this coprecipitated support has been found to be particularly effective to enable a platinum component to be used to treat ozone. Yet another composition which can result in the conversion of ozone to oxygen comprises carbon, and palladium or platinum supported on carbon, manganese dioxide, Carulite® and/or hopcalite. Manganese supported on a refractory oxide such as alumina has also been found to be useful.

Carbon Monoxide—Useful and preferred catalyst compositions to treat carbon monoxide include a composition comprising a refractory metal oxide support on which is dispersed a catalytically effective amount of a platinum or palladium component, preferably a platinum component. A most preferred catalyst composition to treat carbon monoxide comprises a reduced platinum group component supported on a refractory metal oxide, preferably titania. Useful catalytic materials include precious metal components including platinum group components which include the metals and their compounds. Such metals can be selected from platinum, palladium, rhodium and ruthenium, gold and/or silver components. Platinum will also result in the catalytic reaction of ozone. Also useful is a catalyst comprising a precious metal component, preferably a platinum component on a support of coprecipitated zirconia and manganese dioxide.

Preferably, this catalyst embodiment is reduced. Other useful compositions which can convert carbon monoxide to carbon dioxide include a platinum component supported on carbon or a support comprising manganese dioxide. Preferred catalysts to treat such pollutants are reduced. Another composition useful to treat carbon monoxide comprises a platinum group metal component, preferably a platinum component, a refractory oxide support, preferably alumina and titania and at least one metal component selected from a tungsten component and rhenium component, preferably in the metal oxide form.

Hydrocarbons—Useful and preferred catalyst compositions to treat unsaturated hydrocarbons including $C_2$ to about $C_{20}$ olefins and typically $C_2$ to $C_8$ mono-olefins such as propylene and partially oxygenated hydrocarbons as recited have been found to be the same type as recited for use in catalyzing the reaction of carbon monoxide with the preferred compositions for unsaturated hydrocarbons comprising a reduced platinum component and a refractory metal oxide support for the platinum component. A preferred refractory metal oxide support is titania. Other useful compositions which can convert hydrocarbons to carbon dioxide and water include a platinum component supported on carbon or a support comprising manganese dioxide. Preferred catalysts to treat such pollutants are reduced. Another composition useful to convert hydrocarbons comprises a platinum group metal component, preferably a platinum component, a refractory oxide support, preferably alumina and titania and at least one metal component selected from a tungsten component and rhenium component, preferably in the metal oxide form.

Ozone and Carbon Monoxide—A useful and preferred catalyst which can treat both ozone and carbon monoxide comprises a support such as a refractory metal oxide support on which is dispersed a precious metal component. The refractory oxide support can comprise a support component selected from the group consisting of ceria, alumina, silica, titania, zirconia, and mixtures thereof. Also useful as a support for precious metal catalyst components is a coprecipitate of zirconia and manganese oxides. Most preferably, this support is used with a platinum component and the catalyst is in reduced form. This single catalyst has been found to effectively treat both ozone and carbon monoxide. Other useful and preferred precious metal components are comprised of precious metal components selected from palladium and also platinum components with palladium preferred. A combination of a ceria support with a palladium component results in an effective catalyst for treating both ozone and carbon monoxide. Other useful and preferred catalysts to treat both ozone and carbon monoxide include a platinum group component, preferably a platinum component or palladium component and more preferably a platinum component, on titania or on a combination of zirconia and silica. Other useful compositions which can convert ozone to oxygen and carbon monoxide to carbon dioxide include a platinum component supported on carbon or on a support comprising manganese dioxide. Preferred catalysts are reduced.

Ozone, Carbon Monoxide and Hydrocarbons—A useful and preferred catalyst which can treat ozone, carbon monoxide and hydrocarbons, typically low molecular weight olefins ($C_2$ to about $C_{20}$) and typically $C_2$ to $C_8$ mono-olefins and partially oxygenated hydrocarbons as recited comprises a support, preferably a refractory metal oxide support on which is dispersed a precious metal component. The refractory metal oxide support can comprise a support component selected from the group consisting of ceria, alumina, titania, zirconia and mixtures thereof with titania most preferred. Useful and preferred precious metal components are comprised of precious metal components selected from platinum group components including palladium and platinum components with platinum most preferred. It has been found that a combination of a titania support with a platinum component results in the most effective catalyst for treating ozone, carbon monoxide and low molecular weight gaseous olefin compounds. It is preferred to reduce the platinum group components with a suitable reducing agent. Other useful compositions which can convert ozone to oxygen, carbon monoxide to carbon dioxide, and hydrocarbons to carbon dioxide include a platinum component supported on carbon, a support comprising manganese dioxide, or a support comprising a coprecipitate of manganese oxides and zirconia. Preferred catalysts are reduced.

The above compositions can be applied by coating to at least one atmosphere contacting (e.g., vehicle) surface. Particularly preferred compositions catalyze the destruction of ozone, carbon monoxide and/or unsaturated low molecular weight olefinic compounds at ambient conditions or ambient operating conditions.

Various of the catalyst compositions can be combined, and a combined coating applied to the atmosphere contacting surface. Alternatively, different surfaces or different parts of the same surface can be coated with different catalyst compositions.

The method and apparatus of the present invention are preferably designed so that the pollutants can be treated at ambient conditions, requiring no heating means or incidental heat. The present invention is particularly useful for treating ozone by coating a surface (e.g. motor vehicle atmosphere contacting surfaces) with suitable catalysts useful to destroy such pollutants at ambient conditions. The percent conversion of a pollutant, such as ozone depends on the temperature and space velocity of the atmospheric air relative to the catalyst surface, and the temperature of the atmosphere contacting surface.

Accordingly, the present invention, in its most preferred embodiments results in at least reducing the ozone levels present in the atmosphere without the addition of any mechanical features or energy source to existing substrates, particularly motor vehicles. Additionally, the catalytic reaction of ozone to oxygen takes place at the normal ambient conditions experienced by the surfaces of these motor vehicle elements when not in operation so that minimal changes in the construction or method of operation of the motor vehicle are required.

While the preferred embodiments of the present invention are directed to the destruction of pollutants at the ambient operating temperatures, it will be noted that the ambient air may be heated by a heating means such as a heater or by incidental or other contact with a heated component of the stationary substrate (e.g. the engine of a motor vehicle). This may allow other pollutants to be catalyzed which require a higher reaction temperature than the ambient temperature or ambient operating temperature of the atmosphere contacting surface. Such pollutants include carbon monoxide, hydrocarbons and nitrogen oxides. These pollutants can be treated at higher temperatures typically in the range of at least 40 to 450° C. This can be accomplished, for example, by the use of an auxiliary heated catalyzed surface. By an auxiliary heated surface, it is meant that there are supplemental means to heat the surface. A preferred auxiliary heated surface is the surface of an electrically heated catalyzed monolith such as an electrically heated catalyzed metal honeycomb of the type known to those skilled in the art. Electricity can be provided by batteries or a generator such as are present in motor vehicles. The catalyst composition can be any well known oxidation and/or reduction catalyst, preferably a three way catalyst (TWC) comprising precious group metals such as platinum, palladium, rhodium and the like supported on refractory oxide supports.

As previously stated, adsorption compositions can also be used to adsorb pollutants such as hydrocarbons and/or particulate matter for later oxidation or subsequent removal. Useful and preferred adsorption compositions include zeolites, other molecular sieves, carbon, and Group IIA alkaline earth metal oxides such as calcium oxide. Hydrocarbons and particulate matter can be adsorbed from 0° C. to 110° C. and subsequently treated by desorption followed by catalytic reaction or incineration.

It is preferred to coat areas of the substrate that have a relatively high surface area exposed to a large flow rate of atmospheric air. For land use motor vehicles, particularly preferred atmosphere contacting surfaces include the radiator, fan blades, the air conditioning condenser or heat exchanger, air charge cooler, engine oil cooler, transmission oil cooler, and wind deflectors of the type used on the roof of truck cabs.

Most preferably for motor vehicles, the atmosphere contacting surface is a surface of a radiator. The radiator has a large surface area for enhanced cooling of internal combustion engine fluid coolants. By applying a catalyst to be supported on the radiator surface, advantage can be taken of the large honeycomb-like surface area. The high honeycomb-like surface area enables a maximization of contact of the catalyst with the air passing through the honeycomb-like design of the radiator.

The present invention includes methods to coat pollutant treating compositions on to atmosphere contacting surfaces as described herein. In particular, the present invention includes a method to coat catalyst compositions onto finned elements such as radiators, air conditioner condensers, air charge coolers and other surfaces.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 1 is a side schematic view of a truck showing a grill, air conditioner condenser, radiator, fan and engine with a wind deflector on the roof of the truck cab;

FIG. 20 is an XRD pattern for cryptomelane shown as counts using a square root scale versus the Bragg angle, $2\theta$.

DETAILED DESCRIPTION OF THE INVENTION

Figure 5:
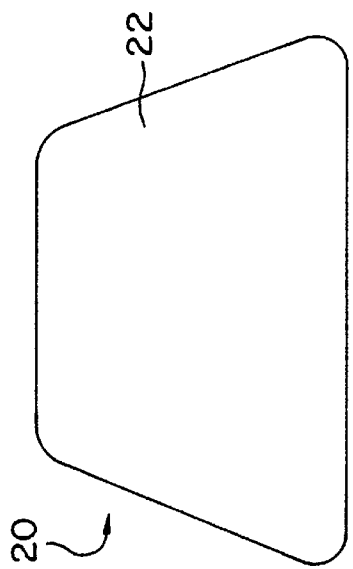
FIG. 5 is a front view of a wind deflector of the type illustrated in FIG. 1.

The present invention is directed to an apparatus and a related method for treating the atmosphere in which a substrate, operatively attached to a non-moving device (e.g. a non-moving motor vehicle), has a pollution treating composition thereon. When air is drawn or forced into contact with the substrate the pollutants are caused to change into non-polluting compounds.

The atmosphere contacting surface of the substrate which contains the pollution treating composition is in direct contact with the atmosphere. Preferred and useful atmosphere contacting surfaces include billboards, signs, heat exchange coils, air conditioning systems, surfaces associated with supplying air to tunnels, and surfaces associated with motor vehicles such as body surfaces, sign deflector surfaces, grill surfaces, mirror backs. Such surfaces must contact the ambient air alone (i.e. relying on natural wind currents) or through the assistance of an air drawing or forcing means such as a fan. In another aspect of the invention, a heating means or incidental heat are used to elevate the temperature of the ambient air making it more susceptible to removal or conversion of additional undesirable pollutants.

In motor vehicles, preferred and useful atmosphere contacting surfaces include body surfaces, wind deflector surfaces, grill surfaces, mirror backs and the surfaces of "under the hood" components. Preferred atmosphere contacting surfaces are located within the body of the motor vehicle, typically in proximity to the engine, i.e., the engine compartment. The surfaces are preferably the surfaces of cooling means which comprise an in flow path for liquids or gases through a coolant walled enclosure such as tubes or a housing and an outer surface on which is located fins to enhance heat transfer. Preferred atmosphere contacting surfaces comprise a finned outer surface and are selected from the outer surfaces of the radiator, air conditioner condenser, the surfaces of the radiator fan, engine oil cooler, transmission oil cooler, power steering fluid cooler and air charge cooler also referred to as an intercooler or after cooler. Surfaces of the air conditioner condenser and radiator are preferred due to their large surface area and relatively high ambient operating temperatures of from about 40° C. to 135° C. and typically up to 110° C. The most preferred atmosphere contacting surfaces are the outer surfaces of the air conditioner condenser and radiator due to the presence of a) a large surface area, b) a fan, c) an electrical power source and d) appropriate sensors as explained hereinafter.

One advantage of the present invention is that the atmosphere contacting surface useful to support a pollution treating composition can be any existing surface which lies in the path of a flow of ambient air. Accordingly, the apparatus and method of the present invention can be located on existing components of new cars or retrofitted onto old cars.

In addition, stationary substrates such as billboards may be coated in accordance with the invention. Conversion of ozone to oxygen can occur by the passage of natural currents of air at ambient temperatures into contact with the coated surfaces of the billboard.

Stationary substrates can also include residential or commercial external (i.e. window) air conditioning systems in which, the heat exchanger, the fan or other suitable surfaces can be coated. Passage of air through the air conditioner will result in the conversion of ozone to oxygen. The present invention is also applicable to tunnels, such as underground tunnels for passage by motor vehicles. The tunnels can be provided with fans which themselves are coated or other coatable surfaces to reduce ozone levels within the tunnel.

The present invention also provides for activating an air drawing device, when natural wind currents must be supplemented, such as a fan when the substrate containing the pollutant treating composition is or is associated with a non-moving article (e.g. a motor vehicle at rest with the motor turned off).

The ambient air is drawn over the substrate such that pollutants contained within the ambient air are converted to non-polluting compounds. Activation of the air drawing device is made by sensing the level of pollutants or ambient temperature, or by a timer or by a remote signal generating device. There may also be provided a sensor for detecting if there is sufficient power to drive the air drawing device and allow easy starting of the vehicle and to cut off the system if the power requirements are insufficient.

The present invention will be understood by those skilled in the art by reference to the accompanying FIGS. 1–17. The present invention can be applied to any non-moving substrate. At least one atmosphere contacting surface comprises a pollutant treating composition (e.g. a catalyst or an adsorber) located thereon. As the atmospheric air encounters the pollutant treating composition, various pollutants including particulate matter and/or gaseous pollutants carried in the air can be catalytically reacted or adsorbed as the case may be by the pollutant treating composition located on the atmosphere contacting surface.

It will be appreciated by those skilled in the art that when the substrate is a vehicle, any suitable vehicle can be employed. Vehicles include cars, trucks, trains, boats, ships, airplanes, dirigibles, balloons and the like.

The atmosphere contacting surface can be any suitable surface that encounters and contacts air while the vehicle or other device is at rest. Preferably in a motor vehicle, the contact means is a surface located toward the front of the vehicle in the vicinity of the cooling system fan. Useful contact surfaces should have a relatively large surface area.

Preferred contact surfaces are at least partially enclosed in the vehicle. Useful contact surfaces include the outside surfaces of the air conditioner condenser, the radiator and the radiator fan which are all located and supported within the housing of the vehicle.

The present invention will be understood by those skilled in the art by reference to the accompanying FIGS. 1–6.

FIG. 1 illustrates a truck 10 schematically containing a variety of vehicle components comprising atmosphere contacting surfaces. These surfaces include the surfaces of grill 12, the air conditioner condenser 14, an air charge cooler 25, the radiator 16, and the radiator fan 18. Also shown on this truck is a wind deflector 20 having a front deflecting surface 22. It is recognized that the various components can have different relative locations on different vehicles.

Referring to FIGS. 1 to 4 the preferred contacting surfaces include the surface of the front 13 and side 15 surfaces of the air conditioner condenser 14, the front 17 and side 19 surfaces of the radiator 16, corresponding surfaces of the air charge cooler 25 and the front 21 and back 23 surfaces of the radiator fan 18. These surfaces are located within the housing 24 of the truck. They are typically under the hood 24 of the truck between the front 26 of the truck and the engine 28. The air conditioner condenser, air charge cooler, radiator and radiator fan can be directly or indirectly supported by housing 24 or a frame (not shown) within the housing.

Figure 2:
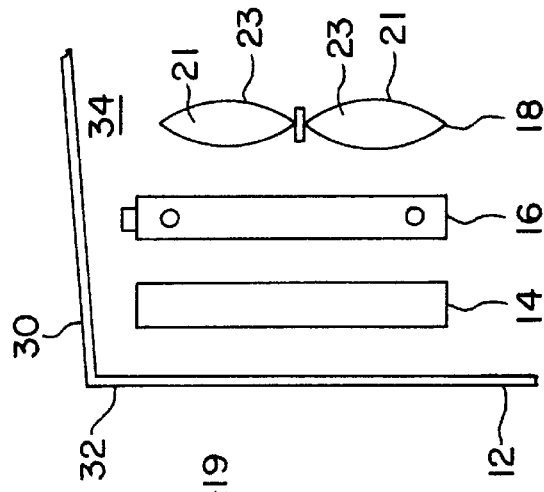
FIG. 2 is a partial schematic view of a motor vehicle showing the grill, air conditioner condenser, radiator and fan.

FIG. 2 generally shows a schematic view of an automobile assembly. Corresponding elements in FIGS. 1 and 2 have common reference characters. The automobile comprises a housing 30. There is a motor vehicle front 32 having a grill 12 supported on the front of the housing 30. An air conditioner condenser 14, a radiator 16, and a radiator fan 18 can be located within the housing 30.

Figure 6:
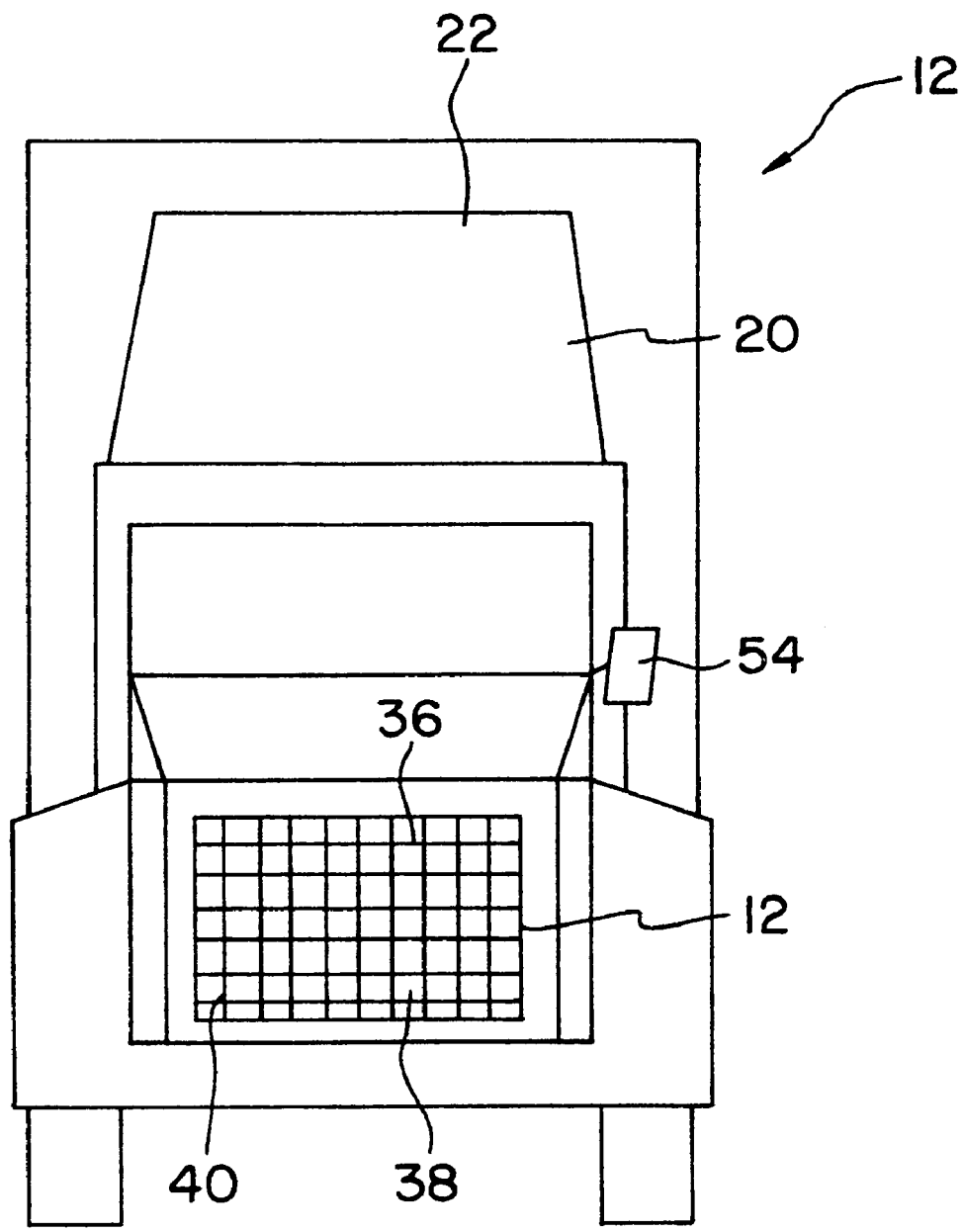
FIG. 6 is a front view of the truck of FIG. 1.

Referring to embodiments in FIGS. 1, 2 and 6, the contacting surface on the front and sides of least one of the grill 12, air conditioner condenser 14, the air charge cooler 25, and radiator 16; the front and back of the radiator fan 18; and the front of the wind deflector 20 can have a pollutant treating composition located thereon. The grill 12 can have a suitable grill grid type design which provides for openings 36 through which air passes as the truck 12 is operated and moves through the atmosphere. The openings are defined by the grill grid 38.

The grill grid 38 has a front grill surface 40 and a side grill surface 42. The front and side grill grid surfaces 40 and 42 can be used as atmosphere contacting surfaces on which pollutant treating compositions are located.

Figure 4:
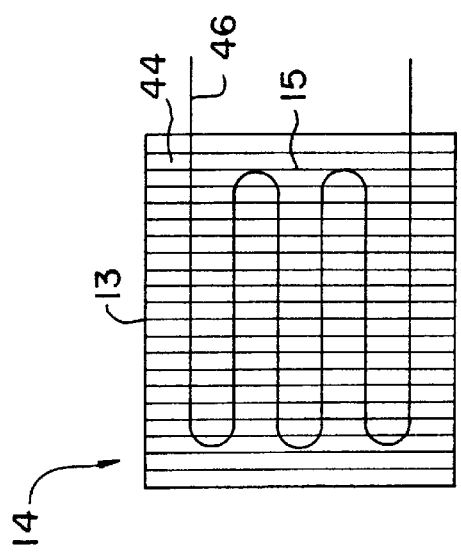
FIG. 4 is a front view of the air conditioner condenser.

Referring to FIGS. 1 and 4, the air conditioning condenser 14 comprises a plurality of air conditioning condenser fins 44.

Additionally, there is an air conditioning fluid conduit 46 which conducts the air conditioning fluid through condenser 14. The front and side surfaces of the air conditioning fins 44, as well as the front surface of the air conditioning conduit 46 can be the atmosphere contacting surfaces on which a pollutant treating composition is located. As indicated, both the front 21 and back 23 surfaces of the radiator fan 18 can be a contacting surface to support a pollutant treating composition.

Figure 3:
FIG. 3 is a front view of the radiator.

The most preferred atmosphere contacting surface is on radiator 16 as shown in FIG. 3. A typical radiator 16 has a frontal radiator surface 17 as well as a plurality of radiator corrugated plates or fins 50 located in corresponding radiator plate or fin channels 52 which pass through the radiator 16. It is preferred to coat the front surface 17 as well as the side surfaces of the radiator plates 50 and channel 52 surfaces. The radiator is most preferred because it is located within the housing 24 or 30 and is protected from the front by at least the grill 12 and preferably an air conditioner condenser 14. In addition to air entering into the hood chamber 34 as the motor vehicle moves through the atmosphere, radiator fan 18 draws air in and through the channels 52. Therefore, the radiator 16 is located and protected by the grill 12, the air conditioner condenser 19 and is in front of the radiator fan 18.

Additionally, as indicated above, the radiator has a large surface area for heat transfer purposes.

The above description is particularly directed to and illustrates the use of atmosphere treating surfaces on apparatus such as radiator 16 and air conditioner condenser 14. As indicated the atmosphere contacting surface can be on other suitable means to cool engine fluids including well known articles such as the above referenced air charge cooler 25 as well as engine oil coolers, transmission oil coolers and power steering oil coolers. A commonality of all such cooling means is a housing or conduit through which the fluid passes. The housing comprises a wall having an inner surface in contact with the fluid and an outer surface typically in contact with the atmosphere within the frame of the vehicle and typically within the engine compartment. In order to efficiently transfer heat from the fluid in these various apparatus, there are fins or plates extending from the outer surface of the cooling, housing or conduit.

Applicant herein incorporates by reference commonly assigned patent application entitled, "Pollution Treating Device and Methods of Making the Same", attorney docket 3794/3810, filed as U.S. Ser. No. 08/537,208. Additionally, any of the embodiments of the apparatus of the present invention and method of use thereof can optionally further incorporate a replaceable pollution treating device as disclosed therein.

Pollutant treating compositions can also be located on outer surfaces of the vehicle. As indicated, such compositions can be located on the grill 12 and in the case of the truck shown in FIGS. 1 and 6, on the wind deflector 20 frontal wind deflector surface 22. Additionally, pollution treatment compositions can be located on the front of the mirror 54 as well as any of a variety of front facing surfaces.

In accordance with the present invention, large volumes of air can be treated at relatively low temperatures. High surface area components of vehicles including radiators, air conditioner condensers and charge air coolers typically have a large frontal surface area which encounters the air stream. However, these devices are relatively narrow, typically ranging from about ¾ of an inch deep up to about 2 inches deep and usually in the range of ¾ to 1 M inches deep. The radiator fan can result in linear velocities of the atmospheric air contacting the frontal surface of such devices is typically in the range of up to about 10, and more typically 5 to 10 miles per hour. An indication of the amount of air being treated as it passes across the catalyzed vehicle component is commonly referred to space velocity or more precisely volume hourly space velocity (VHSV). This is measured as volume (corresponding to the volume of the catalyzed element) of air per hour which passes across the volume of the catalytic article. It is based on the cubic feet per hour of air divided by the cubic feet of catalyst substrate. The volume of the catalyst substrate is the frontal area times the depth or axial length in the direction of the air flow. Alternatively, volume hourly space velocity is the number of catalyst volumes based on the volume of the catalytic article being treated per hour. Because of the relatively short axial depth of the catalyzed elements of the present invention, the space velocities are relatively high. The volume hourly space velocities of air which can be treated in accordance with the present invention can be as high as three quarters of a million or more reciprocal hours. A face velocity of air against one of these elements at 5 miles per hour can result in a space velocity of as high as 300,000 reciprocal hours. In accordance with the present invention, the catalysts are designed to treat pollutants in the atmosphere at space velocities in ranges as high as from 250,000 to 750,000 and typically 300,000 to 600,000 reciprocal hours. This is accomplished even at the relatively low ambient temperatures and ambient operating temperatures of the vehicle elements containing pollutant treating compositions in accordance with the present invention.

The pollutant treating composition is preferably a catalytic composition or adsorption composition. Useful and preferred catalyst compositions are compositions which can catalytically cause the reaction of targeted pollutants at the space velocity of the air as it contacts the surface, and at the temperature of the surface at the point of contact. Typically, these catalyzed reactions will be in the temperature range at the atmosphere contacting surface of from 0° C. to 50° C., more typically 20° C. to 40° C. and yet more typically from about 20° C. to 40° C. However, temperatures can be higher where the temperature of the air stream itself has been heated. Such temperatures may be as high as 100° C. up to 130° C. or even higher where the atmosphere air has been heated in prior processing steps. There is no limit on the efficiency of the reaction as long as some reaction takes place.

Preferably, there is at least a 1% conversion efficiency with as high a conversion efficiency as possible. Useful conversion efficiencies are preferably at least about 5% and more preferably at least about 10%. Preferred conversions depend on the particular pollutant and pollutant treating composition. Where ozone is treated with a catalytic composition on an atmosphere contacting surface it is preferred that the conversion efficiency be greater than about from 30% to 40%, preferably greater than 50%, and more preferably greater than 70%. Preferred conversion for carbon monoxide is greater than 30% and preferably greater than 50%. Preferred conversion efficiency for hydrocarbons and partially oxygenated hydrocarbons is at least 10%, preferably at least 15%, and most preferably at least 25%. The conversion rates for carbon monoxide and hydrocarbon will be higher where the surface temperature and/or air temperature is higher, preferably greater than 40° C. and more preferably greater than 90° C. Where there is supplemental heating of the atmosphere contacting surface, or the air, such as by having an electrically heated catalytic monolith, grid, screen, gauze or the like, it is preferred that the conversion efficiency be greater than 90% and more preferably greater than 95%. The conversion efficiency is based on the mole percent of the particular pollutants in the air which react in the presence of the catalyst composition.

Ozone treating catalyst compositions comprise manganese compounds including manganese dioxide, including non stoichiometric manganese dioxide (e.g., $MnO_{(1.5-20)}$), and/or $Mn_2O_3$. Preferred manganese dioxides, which are nominally referred to as $MnO_2$ have a chemical formula wherein the molar ratio of manganese to oxide is about from 1.5 to 2.0, such as $Mn_8O_{16}$. Up to 100 percent by weight of manganese dioxide $MnO_2$ can be used in catalyst compositions to treat ozone. Alternative compositions which are available comprise manganese dioxide and compounds such as copper oxide alone or copper oxide and alumina.

Useful and preferred manganese dioxides are alpha manganese dioxides nominally having a molar ratio of manganese to oxygen of from 1 to 2. Useful alpha manganese dioxides are disclosed in U.S. Pat. No. 5,340,562 to O'Young, et al.; also in O'Young, Hydrothermal Synthesis of Manganese Oxides with Tunnel Structures presented at the Symposium on Advances in Zeolites and Pillared Clay Structures presented before the Division of Petroleum Chemistry, Inc. American Chemical Society New York City Meeting, Aug. 25–30, 1991 beginning at page 342, and in McKenzie, the Synthesis of Birnessite, Cryptomelane, and Some Other Oxides and Hydroxides of Manganese, Mineralogical Magazine, December 1971, Vol. 38, pp. 493–502 all herein incorporated by reference. For the purposes of the present invention, the preferred alpha manganese dioxide is a 2×2 tunnel structure which can be hollandite ($BaMn_8O_{16} \cdot XH_2O$), cryptomelane ($KMn_8O_{16} \cdot XH_2O$), manjiroite ($NaMn_8O_{16} \cdot xH_2O$) and coronadite ($PbMn_8O_{16} \cdot xH_2O$).

The manganese dioxides useful in the present invention preferably have a surface area of greater than 150 $m^2/g$, more preferably greater than 200 $m^2/g$, yet more preferably greater than 250 $m^2/g$ and most preferably greater than 275 $m^2/g$. The upper range of such materials can be as high as 300 $m^2/g$, 325 $m^2/g$ or even 350 $m^2/g$. Preferred materials are in the range of 200–350 $m^2/g$, preferably 250–325 $m^2/g$ and most preferably 275–300 $m^2/g$. The composition preferably comprises a binder as of the type described below with preferred binders being polymeric binders. The composition can further comprise precious metal components with preferred precious metal components being the oxides of precious metal, preferably the oxides of platinum group metals and most preferably the oxides of palladium or platinum also referred to as palladium black or platinum black. The amount of palladium or platinum black can range from 0 to 25%, with useful amounts being in ranges of from about 1 to 25 and 5 to 15% by weight based on the weight of the manganese component and the precious component.

It has been found that the use of compositions comprising the cryptomelane form of alpha manganese oxide, which also contain a polymeric binder can result in greater than 50%, preferably greater than 60% and most preferably from 75–85% conversion of ozone in a concentration range of from 0 to 400 parts per billion (ppb) and an air stream moving across a radiator at space velocity of from 300,000 to 650,000 reciprocal hours. Where a portion of the cryptomelane is replaced by up to 25% and preferably from 15–25% parts by weight of palladium black (PdO), ozone conversion rates at the above conditions range from 95–100% using a powder reactor.

The preferred cryptomelane manganese dioxide has a crystallite size ranging from 2 to 10 and preferably less than 5 nm. It can be calcined at a temperature range of from 250° C. to 550° C. and preferably below 500° C. and greater than 300° C. for at least 1.5 hours and preferably at least 2 hours up to about 6 hours.

The preferred cryptomelane can be made in accordance described in the above referenced articles and patents to O'Young and McKenzie. The cryptomelane can be made by reacting a manganese salt including salts selected from the group consisting $MnCl_2$, $Mn(NO_3)_2$, $MnSO_4$ and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha manganese useful in the present invention can contain one or more of hollandite, cryptomelane, manjiroite or coronadite compounds. Even when making cryptomelane minor amounts of other metal ions such as sodium may be present. Useful methods to form the alpha manganese dioxide are described in the above references which are incorporated by reference.

The preferred alpha manganese for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate. It has been found that the use of such a material which has been calcined is "clean". The use of material containing inorganic anions can result in conversion of ozone to oxygen of up to about 60%. The use of cryptomelane with a "clean" surface results in conversions of up about 80%.

Figure 19:
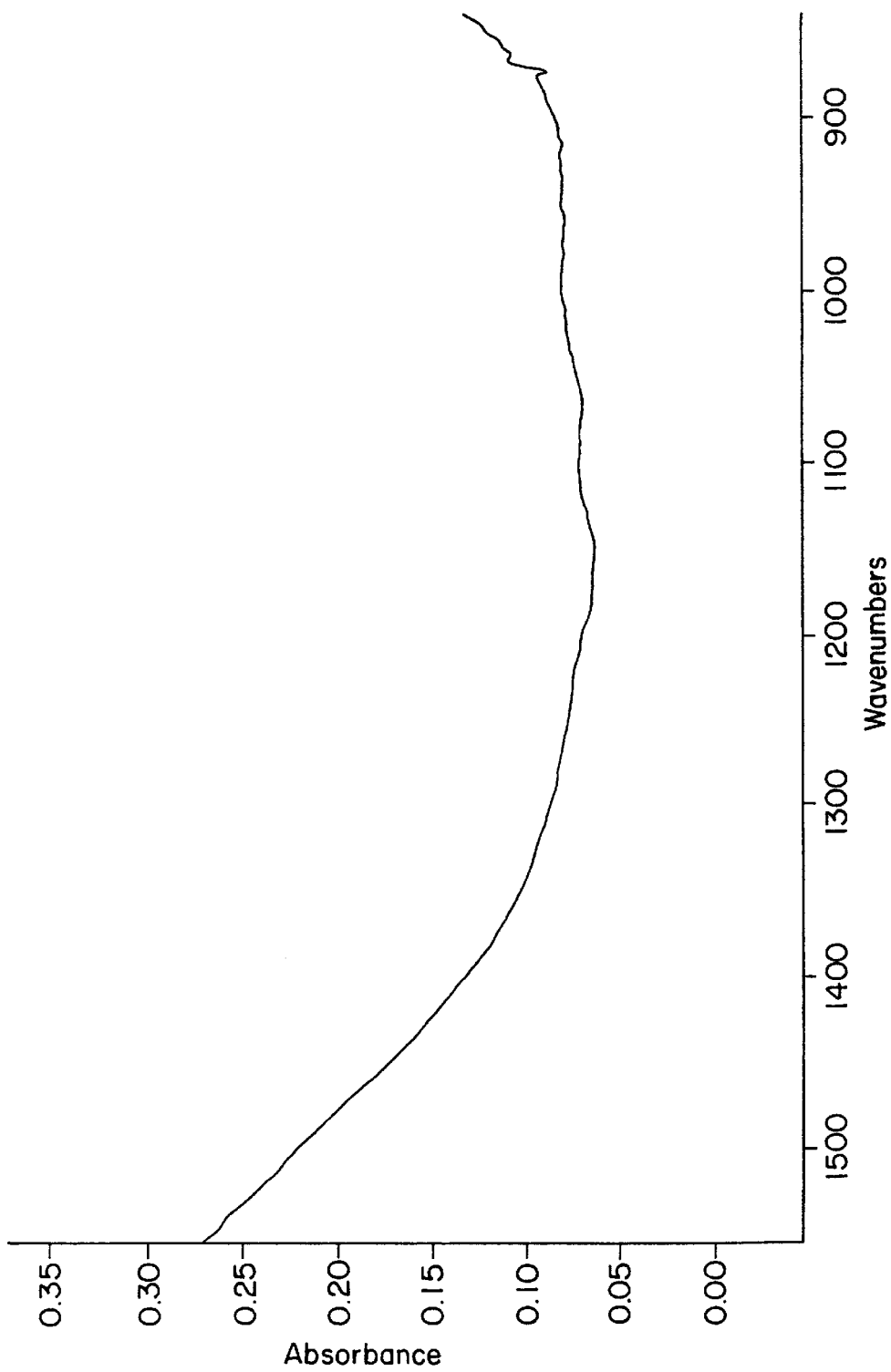
FIG. 19 is an IR spectrum for cryptomelane.

It is believed that the carboxylates are burned off during the calcination process. However, inorganic anions remain on the surface even during calcination. The inorganic anions such as sulfates can be washed away with an aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The nitrate anions may be removed in a similar manner. The "clean" alpha manganese dioxide is characterized as having an IR spectrum as illustrated in FIG. 19 and in X-ray diffraction (XRD) pattern as illustrated in FIG. 20. Such a cryptomelane preferably has a surface area greater than 200 $m^2/g$ and more preferably greater than 250 $m^2/g$. A review of the IR spectrum for the most preferred cryptomelane, shown in FIG. 19 is characterized by the absence of peaks assignable to carbonate, sulfate and nitrate groups. Expected peaks for carbonate groups appear in the range of from 1320 to 1520 wavenumbers; and for sulfate groups appear in the range of from 950 to 1250 wavenumbers. FIG. 20 is a powder X-ray diffraction pattern for high surface area cryptomelane prepared in Example 10. The X-ray pattern for cryptomelane useful in the present invention is characterized by broad peaks resulting from small crystallite size (~5–10nm). Approximate peak positions (±0.15°2θ) and approximate relative intensities (±5) for cryptomelane using $CuK_\alpha$ radiation as shown in FIG. 20 are: 2θ/Relative Intensities—12.1/9; 18/9; 28.3/10; 37.5/100; 41.8/32; 49.7/16; 53.8/5; 60.1/13; 55.7/38; and 68.0/23.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200° C. The resulting cryptomelane crystals have a surface area of typically in the range of from 200 $m^2/g$ to 350 $m^2/g$.

Other useful compositions comprise manganese dioxide and optionally copper oxide and alumina and at least one precious metal component such as a platinum group metal supported on the manganese dioxide and where present copper oxide and alumina. Useful compositions contain up to 100, from 40 to 80 and preferably 50 to 70 weight percent manganese dioxide and 10 to 60 and typically 30 to 50 percent copper oxide. Useful compositions include hopcalite which is about 60 percent manganese dioxide and about 40 percent copper oxide; and Carulite® 200 (sold by Carus Chemical Co.) which is reported to have 60 to 75 weight percent manganese dioxide, 11 to 14 percent copper oxide and 15 to 16 percent aluminum oxide. The surface area of Carulite® is reported to be about 180 $m^2/g$. Calcining at 450° C. reduces the surface area of the Carulite® by about fifty percent (50%) without significantly affecting activity. It is preferred to calcine manganese compounds at from 300° C. to 500° C. and more preferably 350° C. to 450° C. Calcining at 550° C. causes a great loss of surface area and ozone treatment activity. Calcining the Carulite® after ball milling with acetic acid and coating on a substrate can improve adhesion of the coating to a substrate.

Other compositions to treat ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is in amounts of from 0.1 to 5 weight percent, with useful and preferred amounts on pollutant treating catalyst volume, based on the volume of the supporting article, ranging from about 0.5 to about 70 $g/ft^3$. The amount of palladium component preferably ranges from about 2 to about 10 weight percent of the composition, with useful and preferred amounts on pollutant treating catalyst volume ranging from about 10 to about 250 $g/ft^3$.

Various useful and preferred pollutant treating catalyst compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silica-alumina, silica-zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 Am or in sol form also having a particle size ranging from about 1 to about 50 and preferably about 1 to about 10 nm. A preferred titania sol support comprises titania having a particle size ranging from about 1 to about 10, and typically from about 2 to 5 nm.

Also useful as a preferred support is a coprecipitate of a manganese oxide and zirconia. This composition can be made as recited in U.S. Pat. No. 5,283,041 incorporated herein by reference. Briefly, this coprecipitated support material preferably comprises in a ratio based on the weight of manganese and zirconium metals from 5:95 to 95:5; preferably 10:90 to 75:25; more preferably 10:90 to 50:50; and most preferably from 15:85 to 50:50. A useful and preferred embodiment comprises a Mn:Zr weight ratio of 20:80. U.S. Pat. No. 5,283,041 describes a preferred method to make a coprecipitate of a manganese oxide component and a zirconia component. As recited in U.S. Pat. No. 5,283,041 a zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8–9, filtering the resulting precipitate, washing with water, and drying at 450°–500° C.

A useful support for a catalyst to treat ozone is selected from a refractory oxide support, preferably alumina and silica-alumina with a more preferred support being a silica-alumina support comprising from about 1% to 10% by weight of silica and from 90% to 99% by weight of alumina.

Useful refractory oxide supports for a catalyst comprising a platinum group metal to treat carbon monoxide are selected from alumina, titania, silica- zirconia, and manganese- zirconia. Preferred supports for a catalyst composition to treat carbon monoxide is a zirconia-silica support as recited in U.S. Pat. No. 5,145,825, a manganese-zirconia support as recited in U.S. Pat. No. 5,283,041 and high surface area alumina. Most preferred for treatment of carbon monoxide is titania. Reduced catalysts having titania supports resulted in greater carbon monoxide conversion than corresponding non reduced catalysts.

The support for catalyst to treat hydrocarbons, such as low molecular weight hydrocarbons, particularly low molecular weight olefinic hydrocarbons having about from two up to about twenty carbons and typically two to about eight carbon atoms, as well as partially oxygenated hydrocarbons is preferably selected from refractory metal oxides including alumina and titania. As with catalysts to treat carbon monoxide reduced catalysts results in greater hydrocarbon conversion. Particularly preferred is a titania support which has been found useful since it results in a catalyst composition having enhanced ozone conversion as well as significant conversion of carbon monoxide and low molecular weight olefins. Also useful are high surface area, macroporous refractory oxides, preferably alumina and titania having a surface area of greater than 150 $m^2/g$ and preferably ranging from about 150 to 350, preferably from 200 to 300, and more preferably from 225 to 275 $m^2/g$; a porosity of greater than 0.5 cc/g, typically ranging from 0.5 to 4.0 and preferably about from 1 to 2 cc/g measured based on mercury porosometry; and particle sizes range from 0.1 to 10 $\mu$m. A useful material is Versal GL alumina having a surface area of about 260 $m^2/g$, a porosity of 1.4 to 1.5 cc/g and supplied by LaRoche Industries.

A preferred refractory support for platinum for use in treating carbon monoxide and/or hydrocarbons is titania dioxide. The titania can be used in bulk powder form or in the form of titania dioxide sol. The catalyst composition can be prepared by adding a platinum group metal in a liquid media preferably in the form of a solution such as platinum nitrate with the titania sol, with the sol most preferred. The obtained slurry can then be coated onto a suitable substrate such as an atmosphere treating surface such as a radiator, metal monolith substrate or ceramic substrate. The preferred platinum group metal is a platinum compound. The platinum titania sol catalyst obtained from the above procedure has high activity for carbon monoxide and/or hydrocarbon oxidation at ambient operating temperature. Metal components other than platinum components which can be combined with the titania sol include gold, palladium, rhodium and silver components. A reduced platinum group component, preferably a platinum component on titanium catalyst which is indicated to be preferred for treating carbon monoxide, has also been found to be useful and preferred for treating hydrocarbons, particularly olefinic hydrocarbons.

A preferred titania sol support comprises titania having a particle size ranging from about 1 to about 10, and typically from about 2 to 5 nm.

A preferred bulk titania has a surface area of about from 25 to 120 $m^2/g$, and preferably from 50 to 100 $m^2/g$; and a particle size of about from 0.1 to 10 Am. A specific and preferred bulk titania support has a surface area of 45–50 $m^2/g$, a particle size of about 1 $\mu m$, and is sold by DeGussa as P-25.

A preferred silica-zirconia support comprises from 1 to 10 percent silica and 90 to 99 percent zirconia. Preferred support particles have high surface area, e.g. from 100 to 500 square meters per gram ($m^2/g$) surface area, preferably from 150 to 450 $m^2/g$, more preferably from 200 to 400 $m^2/g$, to enhance dispersion of the catalytic metal component or components thereon. The preferred refractory metal oxide support also has a high porosity with pores of up to about 145 nm radius, e.g., from about 0.75 to 1.5 cubic centimeters per gram ($cm^3/g$), preferably from about 0.9 to 1.2 $cm^3/g$, and a pore size range of at least about 50% of the porosity being provided by pores of 5 to 100 nm in radius.

A useful ozone treating catalyst comprises at least one precious metal component, preferably a palladium component dispersed on a suitable support such as a refractory oxide support. The composition comprises from 0.1 to 20.0 weight percent, and preferably 0.5 to 15 weight percent of precious metal on the support, such as a refractory oxide support, based on the weight of the precious metal (metal and not oxide) and the support. Palladium is preferably used in amounts of from 2 to 15, more preferably 5 to 15 and yet more preferably 8 to 12 weight percent. Platinum is preferably used at 0.1 to 10, more preferably 0.1 to 5.0, and yet more preferably 2 to 5 weight percent. Palladium is most preferred to catalyze the reaction of ozone to form oxygen. The support materials can be selected from the group recited above. In preferred embodiments, there can additionally be a bulk manganese component as recited above, or a manganese component dispersed on the same or different refractory oxide support as the precious metal, preferably palladium component. There can be up to 80, preferably up to 50, more preferably from 1 to 40 and yet more preferably 5 to 35 weight percent of a manganese component based on the weight of palladium and manganese metal in the pollutant treating composition. Stated another way, there is preferably about 2 to 30 and preferably 2 to 10 weight percent of a manganese component. The catalyst loading is from 20 to 250 grams and preferably about 50 to 250 grams of palladium per cubic foot ($g/ft^3$) of catalyst volume. The catalyst volume is the total volume of the finished catalyst composition and therefore includes the total volume of air conditioner condenser or radiator including void spaces provided by the gas flow passages. Generally, the higher loading of palladium results in a greater ozone conversion, i.e., a greater percentage of ozone decomposition in the treated air stream.

Conversions of ozone to oxygen attained with a palladium/manganese catalyst on alumina support compositions at a temperature of about 40° C. to 50° C. have been about 50 mole percent where the ozone concentrations range from 0.1 to 0.4 ppm and the face velocity was about 10 miles per hour. Lower conversions were attained using a platinum on alumina catalyst.

Of particular interest is the use of a support comprising the above described coprecipitated product of a manganese oxide, and zirconia which is used to support a precious metal, preferably selected from platinum and palladium, and most preferably platinum. Platinum is of particular interest in that it has been found that platinum is particularly effective when used on this coprecipitated support. The amount of platinum can range from 0.1 to 6, preferably 0.5 to 4, more preferably 1 to 4, and most preferably 2 to 4 weight percent based on metallic platinum and the coprecipitated support. The use of platinum to treat ozone has been found to be particularly effective on this support. Additionally, as discussed below, this catalyst is useful to treat carbon monoxide. Preferably the precious metal is platinum and the catalyst is reduced.

Other useful catalysts to catalytically convert ozone to oxygen are described in U.S. Pat. Nos. 4,343,776 and 4,405,507, both hereby incorporated by reference. A useful and most preferred composition is disclosed in commonly assigned U.S. Ser. No. 08/202,397 filed Feb. 25, 1994, now U.S. Pat. No. 5,422,331 and entitled, "Light Weight, Low Pressure Drop Ozone Decomposition Catalyst for Aircraft Applications" hereby incorporated by reference. Yet other compositions which can result in the conversion of ozone to oxygen comprises carbon, and palladium or platinum supported on carbon, manganese dioxide, Carulite®, and/or hopcalite. Manganese supported on a refractory oxide such as recited above has also been found to be useful.

Other pollutants may require temperatures above ambient temperatures to undergo conversion (e.g. carbon monoxide, hydrocarbons, nitric oxides and the like). Heat can be supplied by a heater or by incidental contact with a heated component of the substrate. Alternatively, the air stream may be at a higher temperature as recited above.

Carbon monoxide treating catalysts preferably comprise at least one precious metal component, preferably selected from platinum and palladium components with platinum components being most preferred. The composition comprises from 0.01 to 20 weight percent, and preferably 0.5 to 15 weight percent of the precious metal component on a suitable support such as refractory oxide support, with the amount of precious metal being based on the weight of precious metal (metal and not the metal component) and the support. Platinum is most preferred and is preferably used in amounts of from 0.01 to 10 weight percent and more preferably 0.1 to 5 weight percent, and most preferably 1.0 to 5.0 weight percent. Palladium is useful in amounts from 2 to 15, preferably 5 to 15 and yet more preferably 8 to 12 weight percent. The preferred support is titania, with titania sol most preferred as recited above. When loaded onto a monolithic structure such as a radiator or onto other atmosphere contacting surfaces the catalyst loading is preferably about 1 to 150, and more preferably 10 to 100 grams of platinum per cubic foot ($g/ft^3$) of catalyst volume and/or 20 to 250 and preferably 50 to 250 grams of palladium per $g/ft^3$ of catalyst volume. Preferred catalysts are reduced. Conversions of 5 to 80 mole percent of carbon monoxide to carbon dioxide were attained using coated core samples from automotive radiator having from 1 to 6 weight percent (based on metal) of platinum on titania compositions at temperatures from 25° to 90° C. where the carbon monoxide concentration was 15 to 25 parts per million and the space velocity was 300,000 to 500,000 reciprocal hours. Also, conversions of 5 to 65 mole percent of carbon monoxide to carbon dioxide were attained using 1.5 to 4.0 weight percent platinum on alumina support compositions at a temperature of about up to 95° C. where the carbon monoxide concentration was about 15 parts per million and the space velocity was about 300,000 reciprocal hours. Lower conversions have been attained with palladium on a ceria support.

An alternate and preferred catalyst composition to treat carbon monoxide comprises a precious metal component supported on the above described coprecipitate of a manganese oxide and zirconia. The coprecipitate is formed as described above. The preferred ratios of manganese to zirconia are 5:95 to 95:5; 10:90 to 75:25; 10:90 to 50:50; and 15:85 to 25:75 with a preferred coprecipitate having a manganese oxides to zirconia of 20:80. The percent of platinum supported on the coprecipitate based on platinum metal ranges from 0.1 to 6, preferably 0.5 to 4, more preferably 1 to 4, and most preferably 2–4 weight percent. Preferably the catalyst is reduced. The catalyst can be reduced in powder form or after it has been coated onto a supporting substrate. Other useful compositions which can convert carbon monoxide to carbon dioxide include a platinum component supported on carbon or a support comprising manganese dioxide.

Catalysts to treat hydrocarbons, typically unsaturated hydrocarbons, more typically unsaturated mono-olefins having from two to about twenty carbon atoms and, in particular, from two to eight carbon atoms, and partially oxygenated hydrocarbons of the type referred to above, comprise at least one precious metal component, preferably selected from platinum and palladium with platinum being most preferred. Useful catalyst compositions include those described for use to treat carbon monoxide. Composition to treat hydrocarbons comprise from 0.01 to 20 wt. % and preferably 0.5 to 15 wt. % of the precious metal component on a suitable support such as a refractory oxide support, with the amount of precious metal being based on the weight of the precious metal, (not the metal component) and the support. Platinum is the most preferred and is preferably used in amounts of from 0.01 to 10 wt. % and more preferably 0.1 to 5 wt. % and most preferably 1.0 to 5 wt. %. When loaded onto a monolithic structure such as a motor vehicle radiator or on to other atmospheric contacting surfaces, the catalyst loading is preferably about 1 to 150, and more preferably 10 to 100 grams of platinum per cubic foot (g/ft$^3$) of catalyst volume. The preferred refractory oxide support is a metal oxide refractory which is preferably selected from ceria, silica, zirconia, alumina, titania and mixtures thereof with alumina and titania being most preferred. The preferred titania is characterized by as recited above with titania sol most preferred. The preferred catalyst is reduced. Testing on a coated automotive radiator resulted in conversions of a low molecular weight mono-olefin such as propylene to water and carbon dioxide with 1.5 to 4 wt. % of platinum on an alumina or titania support have been between 15 and 25% where the propylene concentration was about 10 parts per million propylene and the space velocity was about 320,000 reciprocal hours. These catalysts were not reduced. Reduction of the catalyst improves conversion.

Catalysts useful for the oxidation of both carbon monoxide and hydrocarbons generally include those recited above as useful to treat either carbon monoxide or hydrocarbons. Most preferred catalysts which have been found to have good activity for the treatment of both carbon monoxide and hydrocarbon such as unsaturated olefins comprise platinum component supported on a preferred titania support. The composition preferably comprises a binder and can be coated on a suitable support structure in amounts of from 0.8 to 1.0 g/in. A preferred platinum concentration ranges from 2 to 6% and preferably 3 to 5% by weight of platinum metal on the titania support. Useful and preferred substrate cell densities are equivalent to about 300 to 400 cells per square inch. The catalyst is preferably reduced as a powder or on the coated article using a suitable reducing agent. Preferably the catalyst is reduced in the gas stream comprising about 7% hydrogen with the balance nitrogen at from 200° to 500° C. or from 1 to 12 hours. The most preferred reduction or forming temperature is 400° C. for 2–6 hours. This catalyst has been found to maintain high activity in air and humidified air at elevated temperatures of up to 100° C. after prolonged exposure.

Useful catalysts which can treat both ozone and carbon monoxide comprise at least one precious metal component, most preferably a precious metal selected from palladium, platinum and mixtures thereof on a suitable support such as a refractory oxide support. Useful refractory oxide supports comprise ceria, zirconia, alumina, titania, silica and mixtures thereof including a mixture of zirconia and silica as recited above. Also useful and preferred as a support are the above described coprecipitates of manganese oxides and zirconia. The composition comprises from 0.1 to 20.0, preferably 0.5 to 15, and more preferably from 1 to 10 weight percent of the precious metal component on the support based on the weight of the precious metal and the support. Palladium is preferably used in amounts from 2 to 15 and more preferably from 3 to 8 weight percent. Platinum is preferably used in amounts of from 0.1 to 6 percent and more preferably 2 to 5 weight percent. A preferred composition is a composition wherein the refractory component comprises ceria and the precious metal component comprises palladium. This composition has resulted in relatively high ozone and carbon monoxide conversions. More particularly, testing of this composition on a coated radiator has resulted in a 21% conversion of carbon monoxide in an air stream comprising 16 ppm of carbon monoxide contacting a surface at 95° C. with a face velocity of the gas stream being 5 miles per hour. The same catalyst resulted in a 55% ozone conversion where the stream contained 0.25 ppm of ozone and the treating surface was at 25° C. with an air stream face velocity of 10 miles per hour. Also preferred is a composition comprising a precious metal, preferably a platinum group metal, more preferably selected from platinum and palladium components, and most preferably a platinum component and the above recited coprecipitate of manganese oxide and zirconia. This above recited precious metal containing catalyst in the form of a catalyst powder or coating on a suitable substrate is in reduced form. Preferred reduction conditions include those recited above with the most preferred condition being from 250° to 350° C. for from 2 to 4 hours in a reducing gas comprising 7% hydrogen and 93% nitrogen. This catalyst has been found to be particularly useful in treating both carbon monoxide and ozone. Other useful compositions to convert ozone to oxygen and carbon monoxide to carbon dioxide comprise a platinum component supported on carbon, manganese dioxide, or a refractory oxide support, and optionally having an additional manganese component.

A useful and preferred catalyst which can treat ozone, carbon monoxide and hydrocarbons, as well as partially oxygenated hydrocarbons, comprises a precious metal component, preferably a platinum component on a suitable support such as a refractory oxide support. Useful refractory oxide supports comprise ceria, zirconia, alumina, titania, silica and mixtures thereof including a mixture of zirconia and silica as recited above. Also useful is a support including the above-recited coprecipitate of manganese oxide and zirconia. The composition comprises from 0.1 to 20, preferably 0.5 to 15 and more preferably 1 to 10 wt.% of the precious metal component on the refractory support based on the weight of the precious metal and the support. Where the hydrocarbon component is sought to be converted to carbon dioxide and water, platinum is the most preferred catalyst and is preferably used in amounts of from 0.1 to 5% and more preferably 2 to 5% by weight. In specific embodiments, there can be a combination of catalysts including the above recited catalyst as well as a catalyst which is particularly preferred for the treatment of ozone such as a catalyst comprising a manganese component. The manganese component can be optionally combined with a platinum component. The manganese and platinum can be on the same or different supports. There can be up to 80, preferably up to 50, more preferably from 1 to 40 and yet more preferably from 10 to 35 wt.% of the manganese component based on the weight of the precious metal and manganese in the pollutant treating composition. The catalyst loading is the same at that recited above with regard to the ozone catalyst. A preferred composition is a composition wherein the refractory component comprises an alumina or titania support and the precious metal component comprises a platinum component. Testing of such a composition coated onto a radiator has resulted in 68 to 72% conversion of carbon monoxide, 8 to 15% conversion of ozone and 17 to 18% conversion of propylene when contacting a surface at 95° C. with a face velocity of the gas stream being about ten miles per hour (hourly space velocity of 320,000 per reciprocal hours) with air dew point at 35° F. Generally, as the contacting surface temperature decreases and the space velocity or face velocity of the atmosphere air flow over the pollutant contacting surface increases, the percent conversion decreases.

Catalyst activity, particularly to treat carbon monoxide and hydrocarbons can be further enhanced by reducing the catalyst in a forming gas such as hydrogen, carbon monoxide, methane or hydrocarbon plus nitrogen gas. Alternatively, the reducing agent can be in the form of a liquid such as a hydrazine, formic acid, and formate salts such as sodium formate solution. The catalyst can be reduced as a powder or after coating onto a substrate. The reduction can be conducted in gas at from 150°–500° C., preferably 200°–400° C. for 1 to 12 hours, preferably 2 to 8 hours. In a preferred process, coated article or powder can be reduced in a gas comprising 7% hydrogen in nitrogen at 275°–350° C. for 2 to 4 hours.

An alternate composition for use in the method and apparatus of the present invention comprises a catalytically active material selected from the group consisting of precious metal components including platinum group metal components, gold components and silver components and a metal component selected from the group consisting of tungsten components and rhenium components. The relative amounts of catalytically active material to the tungsten component and /or rhenium component based on the weight of the metal are one from 1–25, to 15–1.

The composition containing a tungsten component and/or a rhenium component preferably comprises tungsten and/or rhenium in the oxide form. The oxide can be obtained by forming the composition using tungsten or rhenium salts and the composition can subsequently be calcined to form tungsten and/or rhenium oxide. The composition can comprise further components such as supports including refractory oxide supports, manganese components, carbon, and coprecipitates of a manganese oxide and zirconia. Useful refractory metal oxides include alumina, silica, titania, ceria, zirconia, chromia and mixtures thereof. The composition can additionally comprise a binder material, such as metal sols including alumina or titania sols or polymeric binder which can be provided in the form of a polymeric latex binder.

In preferred compositions, there are from 0.5 to 15, preferably 1 to 10, and most preferably from 3 to 5 percent by weight of the catalytically active material. The preferred catalytically active materials are platinum group metals with platinum and palladium being more preferred and platinum being most preferred. The amount of tungsten and/or rhenium component based on the metals ranges 1 to 25, preferably 2 to 15 and most preferably 3 to 10 weight percent. The amount of binder can vary from 0 to 20 weight percent, preferably 0.5 to 20, more preferably 2 to 10 and most preferably 2 to 5 weight percent. Depending on the support material a binder is not necessary in this composition. Preferred compositions comprise from 60 to 98.5 weight percent of a refractory oxide support, from 0.5 to 15 weight percent of the catalytically active material, from 1 to 25 weight of the tungsten and/or rhenium component, and from 0 to 10 weight percent binder.

Compositions containing the tungsten component and rhenium component can be calcined under conditions as recited above. Additionally, the composition can be reduced. However, as shown in the examples below, the compositions need not be reduced and the presence of the tungsten and/or rhenium component can result in conversions of carbon monoxide and hydrocarbons comparable to compositions containing platinum group metals which have been reduced.

The pollutant treating compositions of the present invention preferably comprise a binder which acts to adhere the composition and to provide adhesion to the atmosphere contacting surface. It has been found that a preferred binder is a polymeric binder used in amounts of from 0.5 to 20, more preferably 2 to 10, and most preferably to 2 to 5 percent by weight of binder based on the weight of the composition. Preferably, the binder is a polymeric binder which can be a thermosetting or thermoplastic polymeric binder. The polymeric binder can have suitable stabilizers and age resistors known in the polymeric art. The polymer can be a plastic or elastomeric polymer. Most preferred are thermosetting, elastomeric polymers introduced as a latex into the catalyst into a slurry of the catalyst composition, preferably an aqueous slurry. Upon application of the composition and heating the binder material can crosslink providing a suitable support which enhances the integrity of the coating, its adhesion to the atmosphere contacting surface and provides structural stability under vibrations encountered in motor vehicles. The use of preferred polymeric binder enables the pollutant treating composition to adhere to the atmosphere contacting surface without the necessity of an undercoat layer. The binder can comprise water resistant additives to improve water resistance and improve adhesion. Such additives can include fluorocarbon emulsions and petroleum wax emulsions.

Useful polymeric compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, poly vinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoroethylene copolymer, polyamide, phenolic resins and epoxy resins, polyurethane, and silicone polymers. A most preferred polymeric material is an acrylic polymeric latex as described in the accompanying examples.

Particularly preferred polymers and copolymers are vinyl acrylic polymers and ethylene vinyl acetate copolymers. A preferred vinyl acrylic polymer is a cross linking polymer sold by National Starch and Chemical Company as Xlink 2833. It is described as a vinyl acrylic polymer having a Tg of −15° C., 45% solids, a pH of 4.5 and a viscosity of 300 cps. In particular, it is indicated to have vinyl acetate CAS No. 108-05-4 in a concentration range of less than 0.5 percent. It is indicated to be a vinyl acetate copolymer. Other preferred vinyl acetate copolymers which are sold by the National Starch and Chemical Company include Dur-O-Set E-623 and Dur-O-Set E-646. Dur-O-Set E-623 is indicated to be ethylene vinyl acetate copolymers having a Tg of 0° C, 52% solids, a pH of 5.5 and a viscosity of 200 cps. Dur-O-Set E-646 is indicated to be an ethylene vinyl acetate copolymer with a Tg of −12° C., 52% solids, a pH of 5.5 and a viscosity of 300 cps.

An alternate and useful binding material is the use of a zirconium compound. Zirconyl acetate is preferred zirconium compound used. It is believed that zirconia acts as a high temperature stabilizer, promotes catalytic activity, and improves catalyst adhesion. Upon calcination, zirconium compounds such as zirconyl acetate are converted to $ZrO_2$ which is believed to be the binding material. Various useful zirconium compounds include acetates, hydroxides, nitrates, etc. for generating $ZrO_2$ in catalysts. In the case of using zirconyl acetate as a binder for the present catalysts, $ZrO_2$ will not be formed unless the radiator coating is calcined. Since good adhesion has been attained at a "calcination" temperature of only 120° C., it is believed that the zirconyl acetate has not decomposed to zirconium oxide but instead has formed a cross linked network with the pollutant treating material such as Carulite® particles and the acetates which were formed from ball milling with acetic acid. Accordingly, the use of any zirconium containing compounds in the present catalysts are not restricted only to zirconia. Additionally, the zirconium compounds can be used with other binders such as the polymeric binder recited above.

An alternate pollutant treating catalyst composition can comprise activated carbon composition. The carbon composition comprises activated carbon, a binder, such as a polymeric binder, and optionally conventional additives such as defoamers and the like. A useful activated carbon composition comprises from 75 to 85 weight percent activated carbon such as "coconut shell" carbon or carbon from wood and a binder such as an acrylic binder with a defoamer. Useful slurries comprise from 10 to 50 weight percent solids. The activated carbon can catalyze reduction of ozone to oxygen, as well as adsorb other pollutants.

Pollutant treating catalyst compositions of the present invention can be prepared in any suitable process. A preferred process is disclosed in U.S. Pat. No. 4,134,860 herein incorporated by reference. In accordance with this method, the refractory oxide support such as activated alumina, titania or activated silica alumina is jet milled, impregnated with a catalytic metal salt, preferably precious metal salt solution and calcined at a suitable temperature, typically from about 300° C. to about 600° C., preferably from about 350° C. to about 550° C., and more preferably from about 400° C. to about 500° C. for from about 0.5 to about 12 hours. Palladium salts are preferably a palladium nitrate or a palladium amine such as palladium tetraamine acetate, or palladium tetraamine hydroxide. Platinum salts preferably include platinum hydroxide solubilized in an amine. In specific and preferred embodiments the calcined catalyst is reduced as recited above.

In an ozone treating composition, a manganese salt, such as manganese nitrate, can then be mixed with the dried and calcined alumina supported palladium in the presence of deionized water. The amount of water added should be an amount up to the point of incipient wetness. Reference is made to the method reviewed in the above referenced and incorporated U.S. Pat. No. 4,134,860. The point of incipient wetness is the point at which the amount of liquid added is the lowest concentration at which the powdered mixture is sufficiently dry so as to absorb essentially all of the liquid. In this way a soluble manganese salt such as $Mn(NO_3)_2$ in water can be added into the calcined supported catalytic precious metal. The mixture is then dried and calcined at a suitable temperature, preferably 400 to 500° C. for about 0.5 to about 12 hours.

Alternatively, the supported catalytic powder (i.e., palladium supported on alumina) can be combined with a liquid, preferably water, to form a slurry to which a solution of a manganese salt, such as $Mn(NO_3)_2$ is added. Preferably, the manganese component and palladium supported on a refractory support such as activated alumina, more preferably activated silica-alumina is mixed with a suitable amount of water to result in a slurry having from 15 to 40% and preferable 20 to 35 weight percent solids. The combined mixture can be coated onto a carrier such as a radiator and the radiator dried in air at suitable conditions such as 50° C. to 150° C. for 1 to 12 hours. The substrate which supports the coating can then be heated in an oven at suitable conditions typically from 300° C. to 550° C., preferably 350° C. to 500° C., more preferably 350° C. to 450° C. and most preferably from 400° C. and 500° C. in an oxygen containing atmosphere, preferably air for about 0.5 to about 12 hours to calcine the components and help to secure the coating to the substrate atmosphere contacting surface. Where the composition further comprises a precious metal component, it is preferably reduced after calcining.

The method of the present invention includes forming a mixture comprising a catalytically active material selected from at least one platinum group metal component, a gold component, a silver component, a manganese component and water. The catalytically active material can be on a suitable support, preferably a refractory oxide support. The mixture can be milled, calcined and optionally reduced. The calcining step can be conducted prior to adding the polymeric binder. It is also preferred to reduce the catalytically active material prior to adding the polymeric binder. The slurry comprises a carboxylic acid compound or polymer containing carboxylic acid in an amount to result in a pH of about from 3 to 7, typically 3 to 6, and preferably from 0.5 to 15 weight percent of glacial acetic acid based on the weight of the catalytically active material and acetic acid. The amount of water can be added as suited to attain a slurry of the desired viscosity. The percent solids are typically 20 to 50 and preferably 30 to 40 percent by weight. The preferred vehicle is deionized water (D.I.). The acetic acid can be added upon forming the mixture of the catalytically active material, which may have been calcined, with water. Alternatively, the acetic acid can be added with the polymeric binder. A preferred composition to treat ozone using manganese dioxide as the catalyst can be made using about 1,500 g of manganese dioxide which is mixed with 2,250 g of deionized water and 75 g or acetic acid. The mixture is combined in a 1 gallon ballmill and ballmilled for about 8 hours until approximately 90% of the particles are less than 8 micrometers. The ballmill is drained and 150 g of polymeric binder is added. The mixture is then blended on a rollmill for 30 minutes. The resulting mixture is ready for coating onto a suitable substrate such as an automobile radiator according to the methods described below.

The pollutant treating composition can be applied to the atmosphere contacting surface by any suitable means such as spray coating, powder coating, or brushing or dipping the surface into a catalyst slurry.

The atmosphere contacting surface is preferably cleaned to remove surface dirt, particularly oils which could result in poor adhesion of the pollutant treating composition to the surface. Where possible, it is preferred to heat the substrate on which the surface is located to a high enough temperature to volatilize or burn off surface debris and oils.

Where the substrate on which there is an atmosphere contacting surface is made of a material which can withstand elevated temperatures such as an aluminum radiator, the substrate surface can be treated in such a manner as to improve adhesion to the catalyst composition, preferably the ozone carbon monoxide, and/or hydrocarbon catalyst composition. One method is to heat the aluminum substrate such as the radiator to a sufficient temperature in air for a sufficient time to form a thin layer of aluminum oxide on the surface. This helps clean the surface by removing oils which may be detrimental to adhesion. Additionally, if the surface is aluminum a sufficient layer of oxidized aluminum has been found to be able to be formed by heating the radiator in air for from 0.5 to 24 hours, preferably from 8 to 24 hours and more preferably from 12 to 20 hours at from 350° C. to 500° C., preferably from 400 to 500° C. and more preferably 425 to 475° C. In some cases, sufficient adhesion without the use of an undercoat layer has been attained where an aluminum radiator has been heated at 450° C. for 16 hours in air. This method is particularly useful when applying the coating to new surfaces such as radiators or air conditioner condensers prior to assembly in a motor vehicle either as original equipment or replacement.

Adhesion may improve by applying an undercoat or precoat to the substrate. Useful undercoats or precoats include refractory oxide supports of the type discussed above, with alumina preferred. A preferred undercoat to increase adhesion between the atmosphere contacting surface and an overcoat of an ozone catalyst composition is described in commonly assigned U.S. Pat. No. 5,422,331 herein incorporated herein by reference. The undercoat layer is disclosed as comprising a mixture of fine particulate refractory metal oxide and a sol selected from silica, alumina, zirconia and titania sols. In accordance with the method of the present invention, surfaces on existing vehicles can be coated while the substrate such as the radiator, radiator fan or air conditioner condenser is located on the vehicle. The catalyst composition can be applied directly to the surface. Where additional adhesion is desired, an undercoat can be used as recited above.

Where it is practical to separate the radiator from the vehicle, a support material such as activated alumina, silica-alumina, bulk titania, titanium sol, silica zirconia, manganese zirconia and others as recited can be formed into a slurry and coated on the substrate preferably with a silica sol to improve adhesion. The precoated substrate can subsequently be coated with soluble precious metal salts such as the platinum and/or palladium salts, and optionally manganese nitrate. The coated substrate can then be heated in an oven in air for sufficient time (0.5 to 12 hours at 350° C. to 550° C.) to calcine the palladium and manganese components to form the oxides thereof.

The present invention can comprise adsorption compositions supported on the atmosphere contacting surface. The adsorption compositions can be used to adsorb gaseous pollutants such as hydrocarbons and sulfur dioxide as well as particulate matter such as particulate hydrocarbon, soot, pollen, bacteria and germs. Useful supported compositions can include adsorbents such as zeolite to adsorb hydrocarbons. Useful zeolitic compositions are described in Publication No. WO 94/27709 published Dec. 8, 1994 and entitled Nitrous Oxide Decomposition Catalyst hereby incorporated by reference. Particularly preferred zeolites are Beta zeolite, and dealuminated Zeolite Y.

Carbon, preferably activated carbon, can be formed into carbon adsorption compositions comprising activated carbon and binders such as polymers as known in the art. The carbon adsorption composition can be applied to the atmosphere contacting surface. Activated carbon can adsorb hydrocarbons, volatile organic components, bacteria, pollen and the like. Yet another adsorption composition can include components which can adsorb $SO_3$. A particularly useful $SO_3$ adsorbent is calcium oxide. The calcium oxide is converted to calcium sulfate. The calcium oxide adsorbent compositions can also contain a vanadium or platinum catalyst which can be used to convert sulfur dioxide to sulfur trioxide which can then be adsorbed onto the calcium oxide to form calcium sulfate.

Referring generally to FIGS. 8–18 there are shown embodiments of the invention particularly adapted to removing pollutants from the atmosphere from a stationary substrate. By stationary substrate is meant a substrate which itself remains motionless or which is attached to a device which remains motionless (e.g. a motor vehicle at rest with the engine off). Such substrates can be effectively used to remove pollutants from the atmosphere by the use of catalytic or adsorption compositions coated thereon.

Figure 8:
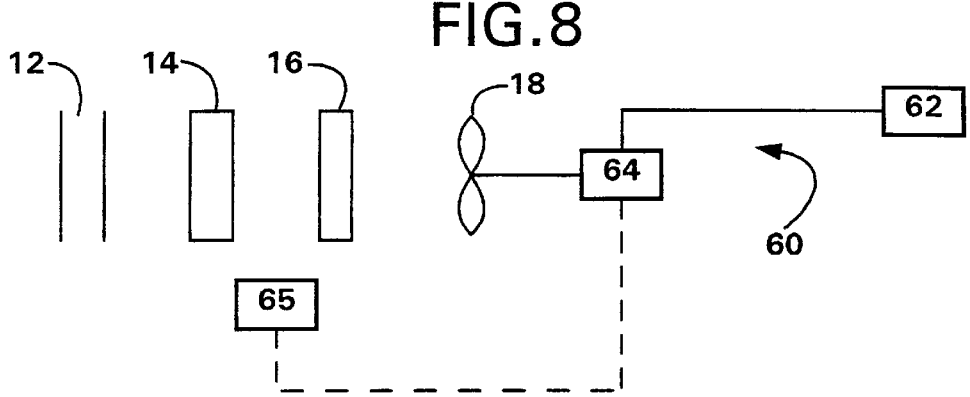
FIG. 8 is a schematic view of an embodiment of the invention wherein the fan is activated when a timing device detects an "on" period of time.

Referring specifically to FIG. 8, there is shown a system 60 for drawing ambient air into contact with a substrate having coated thereon with a pollutant treating composition. The substrate can be, for example, the grill 12, air conditioner condenser 14, radiator 16 or the radiator fan 18.

The radiator fan 18 is activated with energy from a power source 62 such as a car battery, solar panel or the like. In accordance with one aspect of the invention a timing device 64 can be set to have the fan 18 activated during a predetermined period of time when ozone pollution, for example, is at its peak (e.g. noon to 6 p.m.). When the timer reaches noon, the connection between the timing device 64 and power source 62 is switched on and sufficient power is supplied to the fan 18 to draw ambient air into the vehicle and into contact with the pollutant composition coated components of the vehicle.

The temperature of the ambient air may be raised by incidental contact with a component of the substrate that has been heated (e.g. a motor vehicle engine) and is in the process of cooling down or by a separate heating device shown generally be numeral 65. The heating device may be independently activated or connected to the timing device 64. If so connected, the heating device 65 will be activated only at the time that the system 60 is activated.

The purpose of the heating device 65 is to elevate the temperature of the ambient air to make it easier to remove pollutants such as carbon monoxide which react best with the catalyst compositions at elevated temperatures.

Figure 9:
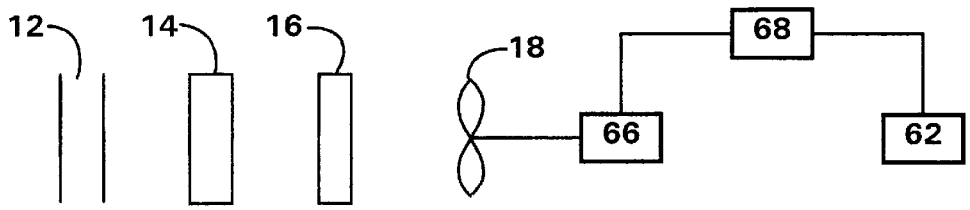
FIG. 9 is a schematic view of another embodiment of the invention where the fan is activated when a temperature sensor senses a temperature at least equal to a predetermined temperature.

The present invention is also applicable to operating the air drawing device at times only when pollutants have reached a predetermined concentration level. Referring to FIG. 9, there is provided a sensor 66 capable of detecting designated one or more pollutants (e.g. ozone) in the atmosphere. The sensor 66 detects the amount of the pollutant in the ambient air being drawn in by the fan 18 and sends a signal to a controller 68. A comparison is made therein between the actual concentration of the pollutant in the ambient air and a predetermined concentration (e.g. 120 ppm for ozone). If the actual concentration exceeds the predetermined concentration, a signal is sent to the power source 62 to activate the fan 18 and commence the depolluting operation.

Figure 10:
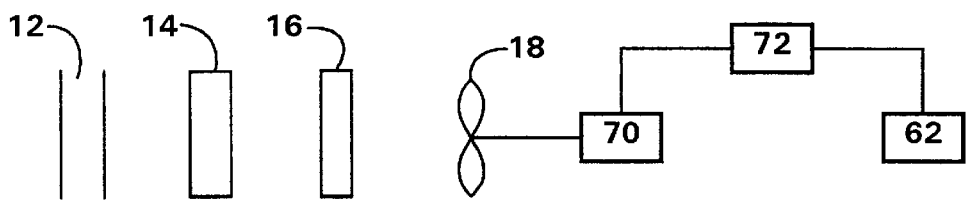
FIG. 10 is a schematic view of another embodiment of the invention where the fan is activated when a pollution sensor detects a level of pollutants at least equal to a predetermined level of pollutants.

An alternative embodiment within the scope of the present invention is to employ the temperature of the atmosphere as a variable in determining when to activate the system. Referring specifically to FIG. 10, there is shown a sensor 70 adapted to detect the temperature of the ambient air and to transmit a signal, corresponding to the actual temperature, to a temperature controller 72. The temperature sensor 70 may be any suitable sensor currently used including those customarily used in motor vehicles.

The temperature sensor 72 compares the signal corresponding to the actual temperature with a predetermined temperature (e.g. 30° C.). If the actual temperature exceeds the predetermined temperature an "on" signal is sent to the power source 62 and the fan is activated. The use of a temperature sensor is a preferred embodiment of the invention because a) such sensors are relatively inexpensive and reliable b) there is a close correlation between the atmospheric temperature and the concentration of pollutants in the atmosphere and c) many motor vehicles already have temperature sensors as standard equipment.

As previously indicated, a number of different power sources may be used to activate the air drawing device including standard motor vehicle batteries, solar panels and the like. When a power source, such as a battery, is used, it is preferred to determine whether there is ample power available to activate the system, otherwise the battery may lose power and the motor vehicle will not be able to start. It is therefore desirable to employ a power sensing device in the system which turns off the system when the power level of the battery is reduced.

Figure 11:
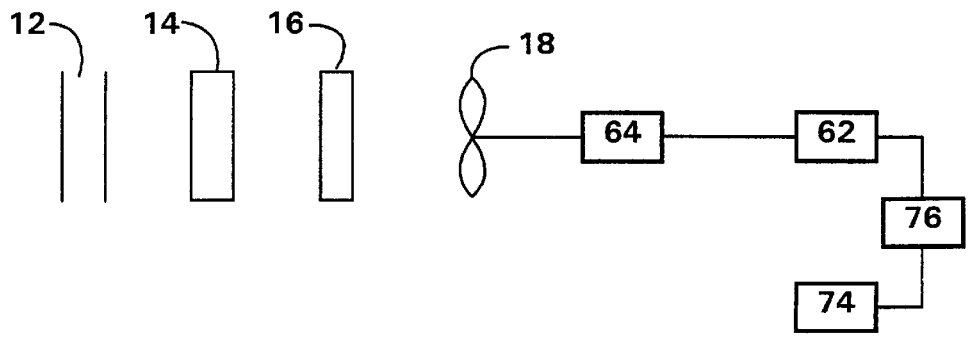
FIG. 11 is a schematic view similar to FIG. 8 of a still further embodiment of the invention wherein a sensor detects the level of power in the power source.
Figure 12:
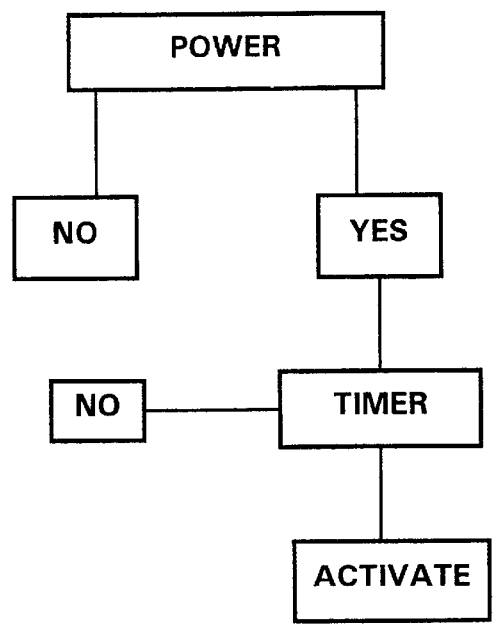
FIG. 12 is a flow chart showing the operation of the embodiment shown in FIG. 11.
Figure 13:
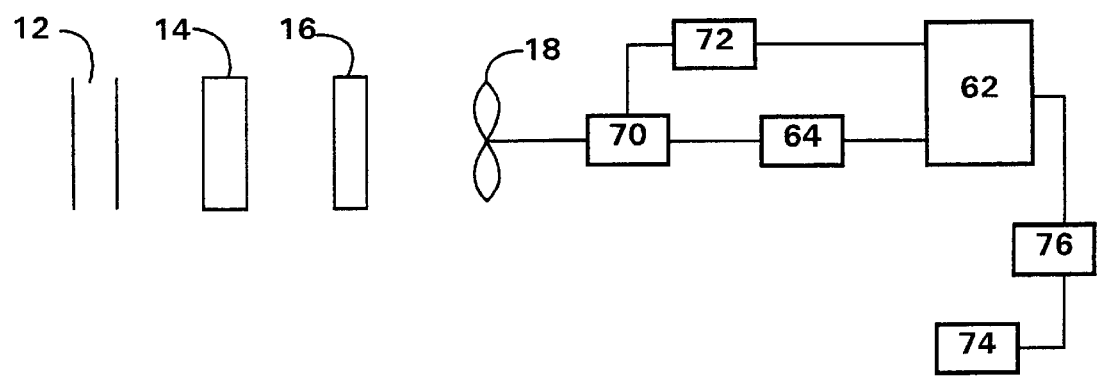
FIG. 13 is a schematic view of another embodiment of the invention including a sensor for detecting the level of power in the power source, a timer for limiting operation of the device to a predetermined period of time and a sensor for detecting either temperature or the level of pollutants in the atmosphere.
Figure 14:
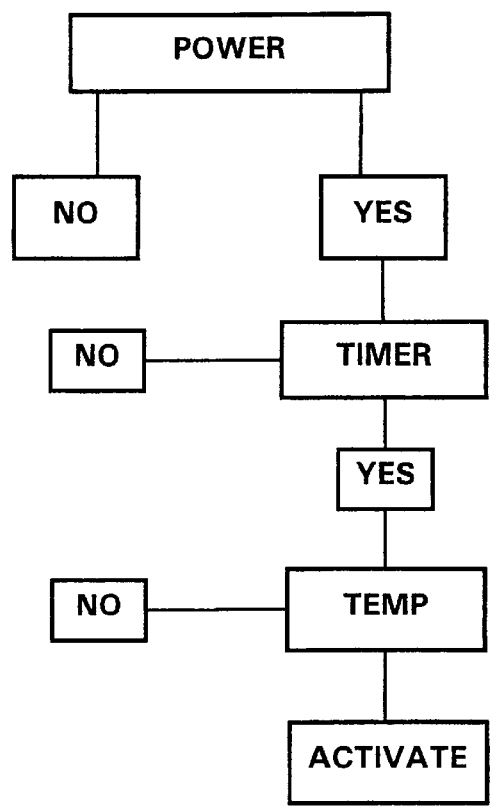
FIG. 14 is a flow chart showing the operation of the embodiment shown in FIG. 13.

Referring to FIG. 11, there is shown an embodiment of the invention employing a power sensor 74 operatively connected to the battery 62. The power sensor 74 detects the level of power (e.g. available voltage) in the battery 62 and transmits a signal to a controller 76. The signal corresponding to the actual amount of available power is compared to a predetermined level of power. If the actual available power is less than the predetermined power level an "off" signal is transmitted to the power source 62 and the system is thereby deactivated.

As shown in FIG. 11, the system described above may be coupled with a timing device or a pollution sensor or temperature sensor as described in connection with FIGS. 9 and 10, respectively. The operation of such a system can be explained with reference to FIG. 12. If there is insufficient power detected by the sensor 74, the system will not activate. Even if the power level from the power source is sufficient to activate the system, the timing device 64 will only permit activation during the preselected period of time (e.g. noon to 6 p.m.). Alternatively, if a pollution sensor is employed, activation of the fan 18, even if sufficient power is available, will only be made when the concentration of pollutants in the ambient air exceeds a predetermined concentration. Still further, if a temperature sensor is used, activation will only occur if the temperature of the ambient air exceeds a predetermined temperature level.

The present invention may employ a combination of sensors or timers so as to more precisely dictate when the system should be activated. By way of example, reference is made to FIG. 13. There is provided both a timing device 64 and a temperature sensor 70. The operation of this system is described with reference to FIG. 14. In operation, the timing device 64 may be set for a preselected time period (e.g. noon to 6 p.m.). Once it is determined that there is sufficient power available as detected by the power sensor 76, the system will be activated during the preselected time period only if the actual temperature exceeds the predetermined temperature. If so, an appropriate signal is sent from the temperature controller 72 to the power source 62. Other embodiments reflecting similar arrangements would be apparent to those of ordinary skill such as the combination of a pollution sensor and a timing device and the like.

Figure 15:
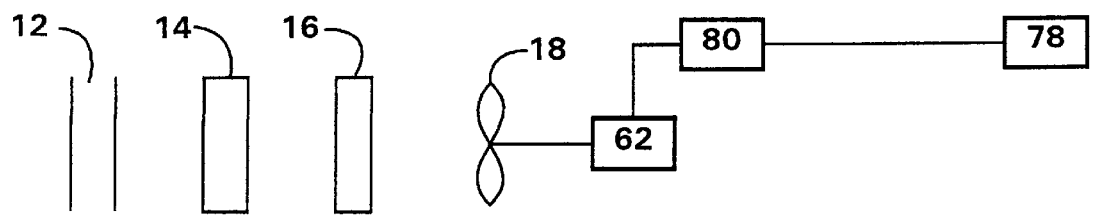
FIG. 15 is a further embodiment of the invention wherein the device includes a remotely positioned signal generator and a receiver within the vehicle for activating the fan.

The present invention also includes means by which the system may be remotely activated. Referring to FIG. 15 there is shown a remotely positioned signal generator 78 capable of generating a signal such as a radiofrequency signal and the like. The generator may, for example, be a hand held remote customary used for keyless door locks or a device positioned in a permanent location. The motor vehicle or other stationary substrate is provided with a receiver 80 which receives the signal and translates the same into an "on" signal for activating the power source 62 to deliver power to the fan 18.

This system like the others previously described is preferably provided with a power sensor 74 and controller 76 for assuring that the power source 62 has available a sufficient amount of reserve power to operate the system and allow the vehicle to start easily without depleting the power source.

Figure 16:
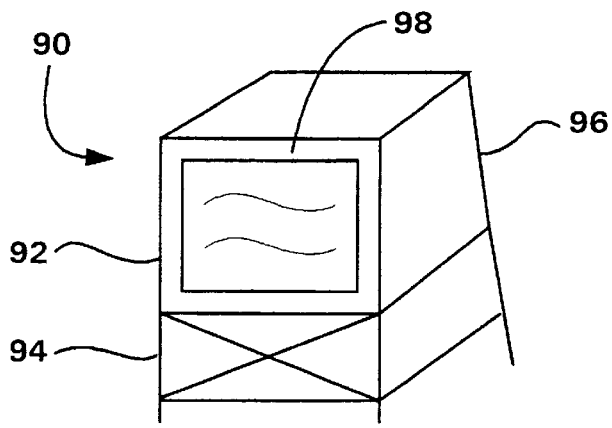
FIG. 16 is a still further embodiment of the invention applied to a conventional billboard.

As previously indicated, the present invention is applicable to a variety of non-moving substrates. Referring to FIG. 16, there is shown a free standing billboard assembly 90 comprising an advertisement display 92, a front support 94 and a rear support assembly 96. The pollutant treating composition may be applied to the front and rear supports 94, 96 and/or to the perimeter 98 of the display 92. This embodiment of the invention relies on ambient air brought into contact with the pollutant treating composition through natural wind currents.

Figure 17:
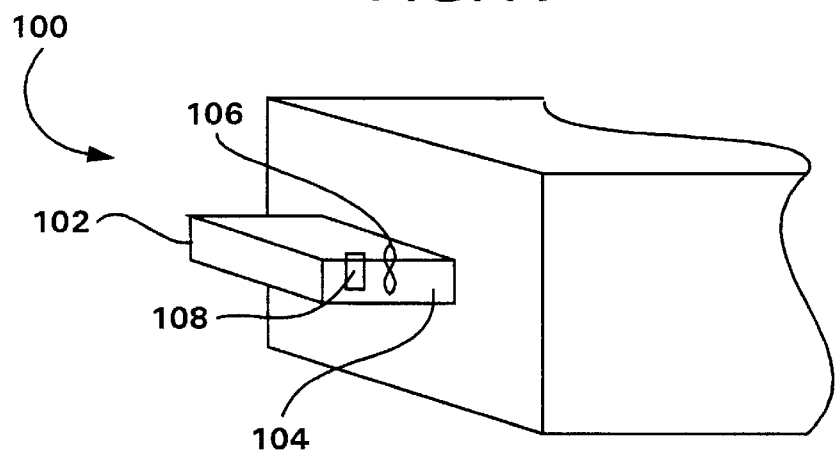
FIG. 17 is a further embodiment of the invention as applied to a residential window air conditioning unit.

Referring to FIG. 17, there is shown a customary residential window mounted air conditioning unit 100 comprised of a housing 102 containing therein an air conditioning assembly shown generally by the numeral 104 which includes a fan 106, a condenser 108 and a motor (not shown). Any or all of the surfaces of the air conditioning assembly 104 and housing 102 may be coated with the pollutant treating composition of the present invention.

Figure 18:
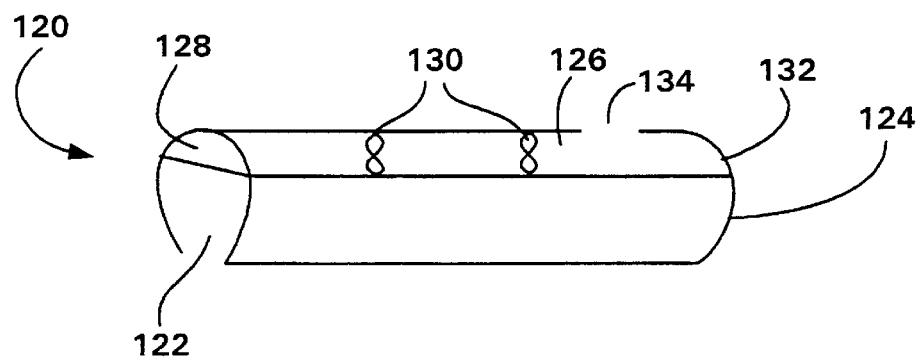
FIG. 18 is still another embodiment of the invention applied to a tunnel.

The present invention may also be applied to removing pollutants, particularly ozone from underground tunnels, such as transportation tunnels traveled by motor vehicles. Referring to FIG. 18, there is shown a transportation tunnel 120, having an entrance 122 and exit 124 allowing motor vehicles to pass therethrough. In accordance with the present invention, the tunnel can be provided with a duct 126 having a forward opening 128 for drawing or forcing air into the duct 126 by at least one fan 130. The fan 130 or other suitable surfaces within the duct 126 or the duct itself may be coated with the pollutant treating composition of the present invention. In operation, the fans draw or force ambient air into the duct. As the air contacts coated surfaces within the duct, ozone is converted into oxygen which is then released through a rearward opening 132 or a vent 134 positioned downstream of the fans 130.

The present invention is illustrated further by the following examples which are not intended to limit the scope of this invention. Additionally, useful compositions are exemplified in commonly assigned and copending U.S. Ser. No. 08/589,182, entitled VEHICLE HAVING ATMOSPHERE POLLUTANT TREATING SURFACE filed concurrently and having attorney docket number 3777C.

EXAMPLE 1

A 1993 Nissan Altima radiator core (Nissan part number 21460-1E400) was heat treated in air to 450° C. for 16 hours to oxidize the surface and then a portion coated with high surface area silica-alumina undercoat (dry loading=0.23 g/in$^3$) by pouring a water slurry containing the silica-alumina through the radiator channels, blowing out the excess with an air gun, drying at room temperature with a fan, and then calcining to 450° C. The silica-alumina slurry was prepared by ball milling high surface area calcined SRS-II alumina (Davison) with acetic acid (0.5% based on alumina) and water (total solids ca. 20%) to a particle size of 90%<4 μm. The ball milled material was then blended with Nalco silica sol (#91SJ06S—28% solids) in a ratio of 25%/75%. The SRS-II alumina is specified to have a structure of $xSiO_2 \cdot yAl_2O_3 \cdot zH_2O$ with 92–95% by weight $Al_2O_3$ and 4–7% by weight $SiO_2$ after activation. BET surface area is specified to be a minimum of 260 m$^2$/g after calcination.

Figure 7:
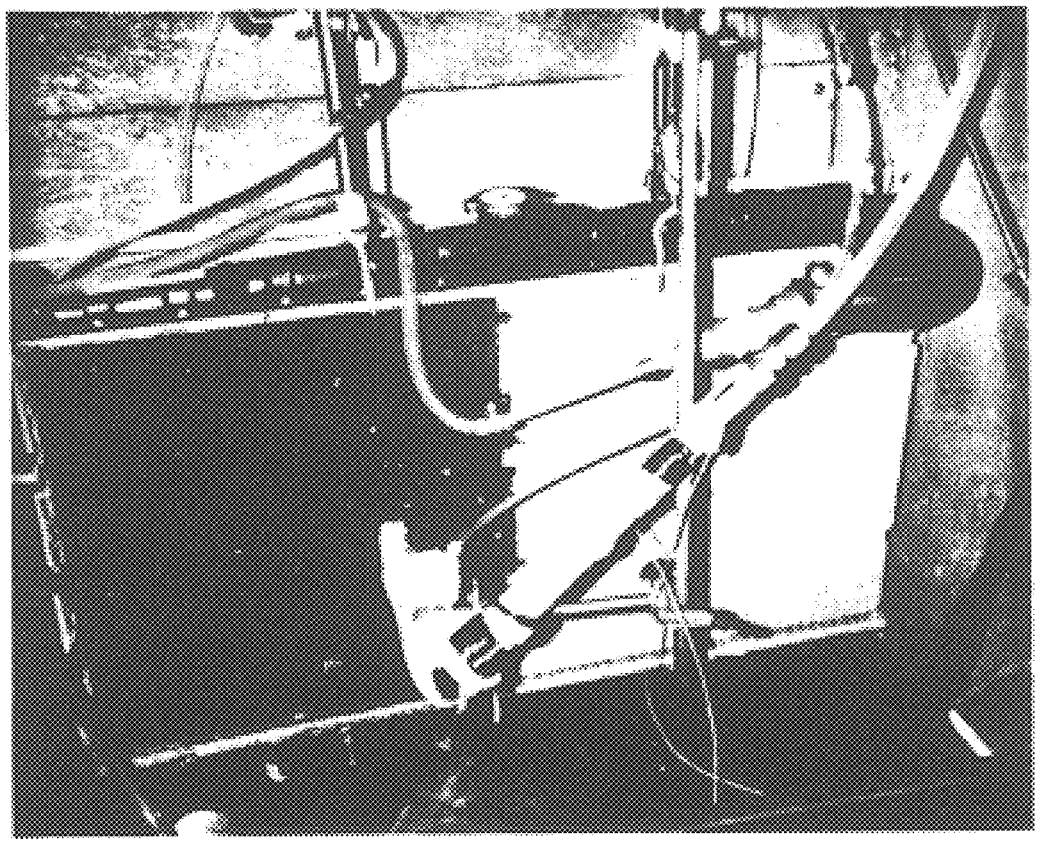
FIG. 7 is a copy of a photograph of the coated radiator from Examples 1 and 2.

A Pd/Mn/Al$_2$O$_3$ catalyst slurry (nominally 10% by weight palladium on alumina) was prepared by impregnating high surface area SRS-II alumina (Davison) to the point of incipient wetness with a water solution containing sufficient palladium tetraamine acetate. The resulting powder was dried and then calcined for 1 hour at 450° C. The powder was subsequently mixed under high shear with a water solution of manganese nitrate (amount equivalent to 5.5% by weight MnO$_2$ on the alumina powder) and sufficient dilution water to yield a slurry of 32–34% solids. The radiator was coated with the slurry, dried in air using a fan, and then calcined in air at 450° C. for 16 hours. This ozone destruction catalyst contained palladium (dry loading=263 g/ft$^3$ of radiator volume) and manganese dioxide (dry loading=142 g/ft$^3$) on high surface area SRS-II alumina. The partially coated radiator reassembled with the coolant headers is shown in FIG. 7.

Ozone destruction performance of the coated catalyst was determined by blowing an air stream containing a given concentration of ozone through the radiator channels at face velocities typical of driving speeds and then measuring the concentration of ozone exiting the back face of the radiator. The air had a temperature of about 20° C. and had a dew point of about 35° F. Ozone concentrations ranged from 0.1–0.4 ppm. Ozone conversion was measured at linear air velocities (face velocities) equivalent to 12.5 miles per hour to be 43%; at 25 mph to be 33%; at 37.5 mph to be 30% and at 49 mph to be 24%.

EXAMPLE 2 (COMPARATIVE)

A portion of the same radiator used in Example 1 which was not coated with catalyst was similarly evaluated for ozone destruction performance (i.e. control experiment). No conversion of ozone was observed.

EXAMPLE 3

A 1993 Nissan Altima radiator core (Nissan part number 21460-1E400) was heat treated in air to 400° C. for 16 hours and then a portion coated with Condea high surface area SBA-150 alumina (dry loading=0.86 g/in$^3$) by pouring a water slurry containing the alumina through the radiator channels, blowing out the excess with an air gun, drying at room temperature with a fan, and then calcining to 400° C. The alumina precoat slurry was prepared as described in Example 3. The radiator was then coated sequentially in 2"×2" square patches with seven different CO destruction catalysts (Table II). Each coating was applied by pouring a water slurry containing the specific catalyst formulation through the radiator channels, blowing out the excess with an air gun, and drying at room temperature with a fan.

The Carulite® and 2% Pt/Al$_2$O$_3$ catalysts (Patch #4 and #6, respectively) were prepared according to the procedure described in Example 3. The 3% Pt/ZrO$_2$/SiO$_2$ catalyst (Patch #3) was made by first calcining 5μg of zirconia/silica frit (95% ZrO$_2$/5%SiO$_2$-Magnesium Elektron XZO678/01) for 1 hour at 500° C. A catalyst slurry was then prepared by adding to 480 g of deionized water, 468 g of the resulting powder, 42 g of glacial acetic acid, and 79.2 g of a platinum salt solution (18.2% Pt) derived from H$_2$Pt(OH)$_6$ solubilized with an amine. The resulting mixture was milled on a ball mill for 8 hours to a particle size of 90% less than 3 μm.

The 3% Pt/TiO$_2$ catalyst (Patch #7) was prepared by mixing in a conventional blender 500 g of TiO$_2$ (Degussa P25), 500 g of deionized water, 12 g of concentrated ammonium hydroxide, and 82 g of a platinum salt solution (18.2% Pt) derived from H$_2$Pt(OH)$_6$ solubilized with an amine. After blending for 5 minutes to a particle size of 90% less than 5 μm, 32.7 g of Nalco 1056 silica sol and sufficient deionized water to reduce the solids content to ca. 22% was added. The resulting mixture was blended on a roll mill to mix all ingredients.

The 3% Pt/Mn/ZrO$_2$ catalyst slurry (Patch #5) was prepared by combining in a ball mill 70 g of manganese/zirconia frit comprising a coprecipitate of 20 weight percent manganese and 80 weight percent zirconium based on metal weight (Magnesium Elektron XZO719/01), 100 g of deionized water, 3.5 g of acetic acid and 11.7 g of a platinum salt solution (18.2% Pt) derived from H$_2$Pt(OH)$_6$ solubilized with an amine. The resulting mixture was milled for 16 hours to a particle size 90% less than 10 μm.

The 2% Pt/CeO$_2$ catalyst (Patch #1) was prepared by impregnating 490 g of alumina stabilized high surface area ceria (Rhone Poulenc) with 54.9 g of a platinum salt solution (18.2% Pt) derived from H$_2$Pt(OH)$_6$ solubilized with an amine and dissolved in deionized water (total volume—155mL). The powder was dried at 110° C. for 6 hours and calcined at 400° C. for 2 hours. A catalyst slurry was then prepared by adding 491 g of the powder to 593 g of deionized water in a ball mill and then milling the mixture for 2 hours to a particle size of 90% less than 4 μm. The 4.6% Pd/CeO$_2$ catalyst (Patch #2) was prepared similarly via incipient wetness impregnation using 209.5 g (180mL) of palladium tetraamine acetate solution.

After all seven catalysts were applied, the radiator was calcined for about 16 hours at 400° C. After attaching the radiator core to the plastic tanks, CO destruction performance of the various catalysts were determined by blowing an air stream containing CO (ca. 16ppm) through the radiator channels at a 5 mph linear face velocity (315,000/h space velocity) and then measuring the concentration of CO exiting the back face of the radiator. The radiator temperature was ca. 95° C., and the air stream had a dew point of approximately 35° F. Results are summarized in Table II.

Ozone destruction performance was measured as described in Example 1 at 25° C., 0.25 ppm ozone, and a linear face velocity of 10 mph with a flow of 135.2 L/min and an hourly space velocity of 640,000/h. The air used had a dewpoint of 35° F. Results are summarized in Table II. FIG. 9 illustrates CO conversion v. temperature for Patch Nos. 3, 6 and 7.

The catalysts were also tested for the destruction of propylene by blowing an air stream containing propylene (ca. 10 ppm) through the radiator channels at a 5 mph linear face velocity, with a flow rate of 68.2 L/min and an hourly space velocity of 320,000/h, and then measuring the concentration of propylene exiting the back face of the radiator. The radiator temperature was ca. 95° C., and the air stream had a dew point of approximately 35° F. Results are summarized in Table I.

TABLE II—CO/HC/OZONE CONVERSION SUMMARY (SEE NEXT PAGE)

A $Pt/Al_2O_3$ catalyst (nominally 2% by weight Pt on $Al_2O_3$) was prepared by impregnating 114 g of a platinum salt solution derived from $H_2Pt(OH)_6$ solubilized in an amine, (17.9% Pt), dissolved in 520 g of water to 1000 g of Condea SBA-150 high surface area (specified to be about 150 $m^2/g$) alumina powder. Subsequently 49.5 g of acetic acid was added. The powder was then dried at 110° C. for 1 hour and calcined at 550° C. for 2 hours. A catalyst slurry was then prepared by adding 875 g of the powder to 1069 g of water and 44.6 g of acetic acid in a ball mill and milling the mixture to a particle size 90%<10 μm. (Patches 1 and 4)

A carbon catalyst slurry was a formulation (29% solids) purchased from Grant Industries, Inc., Elmwood Park, N.J. The carbon is derived from coconut shell. There is an acrylic binder and a defoamer. (Patches 8 and 12)

The Carulite® 200 catalyst ($CuO/MnO_2$) was prepared by first ball milling 1000 g of Carulite® 200 (purchased from Carus Chemical Co., Chicago, Ill.) with 1500 g of water to

TABLE I

CO/HC/OZONE CONVERSION SUMMARY

| PATCH # | CATALYST | CARBON MONOXIDE CONVERSION (%)[1] | OZONE CONVERSION (%)[2] | PROPYLENE CONVERSION (%)[3] |
|---|---|---|---|---|
| 1 | 2% $Pt/CeO_2$ 0.7 $g/in^3$ (24 $g/ft^3$ Pt) | 2 | 14 | 0 |
| 2 | 4.6% $Pd/CeO_2$ 0.5 $g/in^3$ (40 $g/ft^3$ Pd) | 21 | 55 | 0 |
| 3 | 3% $Pt/ZrO_2/SiO_2$ 0.5 $g/in^3$ (26 $g/ft^3$ Pt) | 67 | 14 | 2 |
| 4 | Carulite 200 0.5 $g/in^3$ 3% $SiO_2/Al_2O_3$ binder | 5 | 56 | 0 |
| 5 | 3% $Pt/Mn/ZrO_2$ 0.7 $g/in^3$ (36 $g/ft^3$ Pt) | 7 | 41 | 0 |
| 6 | 2% $Pt/Al_2O_3$ 0.5 $g/in^3$ (17 $g/ft^3$ Pt) | 72 | 8 | 17 |
| 7 | 3% $Pt/TiO_2$ 0.7 $g/in^3$ (36 $g/ft^3$ Pt) 3% $SiO_2/Al_2O_3$ binder | 68 | 15 | 18 |

[1]Test Conditions: 16 ppm CO; 95° C.; 5 mph face velocity; 68.2 L/min; LHSV (hourly space velocity) = 320,000/h; Air dewpoint = 35° F.
[2]Test Conditions: 0.25 ppm $O_3$; 25° C.; 10 mph face velocity; 135.2 L/min; LHSV (hourly space velocity) = 640,000/h; Air dewpoint = 35° F.
[3]Test Conditions: 10 ppm propylene; 95° C.; 5 mph face velocity; 68.2 L/min; LHSV (hourly space velocity) = 320,000/h; Air dewpoint = 35° F.

EXAMPLE 4

After heat treatment for 60 hours in air at 450° C., a Lincoln Town Car radiator core (part #F1VY-8005-A) was coated sequentially in 6"×6" square patches with a variety of different ozone destruction catalyst compositions (i.e., different catalysts; catalyst loadings, binder formulations, and heat treatments). Several of the radiator patches were precoated with a high surface area alumina or silica-alumina and calcined to 450° C. prior to coating with the catalyst. The actual coating was accomplished similarly to Example 1 by pouring a water slurry containing the specific catalyst formulation through the radiator channels, blowing out the excess with an air gun, and drying at room temperature with a fan. The radiator core was then dried to 120° C., or dried to 120° C. and then calcined to 400 to 450° C. The radiator core was then reattached to its plastic tanks and ozone destruction performance of the various catalysts was determined at a radiator surface temperature of about 40° C. to 50° C. and a face velocity of 10 mph as described in Example 1.

Table I summarizes the variety of catalysts coated onto the radiator. Details of the catalyst slurry preparations are given below.

a particle size 90%<6 μm. Carulite® 200 is specified as containing 60 to 75 weight percent $MnO_2$, 11–14 percent CuO and 15–16 percent $Al_2O_3$. The resulting slurry was diluted to ca. 28% solids and then mixed with either 3% (solids basis) of Nalco #1056 silica sol or 2% (solids basis) National Starch #x4260 acrylic copolymer. (Patches 5, 9 and 10)

The $Pd/Mn/Al_2O_3$ catalyst slurry (nominally 10% by weight palladium on alumina) was prepared as described in Example 1. (Patches 2, 3 and 6)

An I.W. (incipient wetness) $Pd/Mn/Al_2O_3$ catalyst (nominally 8% palladium and 5.5% $MnO_2$ based on alumina) was prepared similarly by first impregnating high surface area SRS-II alumina (Davison) to the point of incipient wetness with a water solution containing palladium tetraamine acetate. After drying and then calcining the powder for two hours at 450° C., the powder was reimpregnated to the point of incipient wetness with a water solution containing manganese nitrate. Again, after drying and calcination at 450° C. for two hours, the powder was mixed in a ball mill with acetic acid (3% by weight of catalyst powder) and enough water to create a slurry of 35% solids. The mixture was then milled until the particle size was 90%<8 μm. (Patches 7 and 11) The $SiO_2/Al_2O_3$ precoat slurry was prepared as described in Example 1. (Patches 3 and 11)

The $Al_2O_3$ precoat slurry was prepared by ball milling high surface area Condea SBA-150 alumina with acetic acid (5% by weight based on alumina) and water (total solids ca. 44%) to a particle size of 90%<10 μm. (Patches 9 and 12) Results are summarized in Table I. The conversion of carbon monoxide after being on the automobile for 5,000 miles was also measured at the conditions recited in Example 1 for patch #4. At a radiator temperature of 50° C. and a linear velocity of 10 mph no conversion was observed.

TABLE II—CATALYST SUMMARY (SEE NEXT PAGE)

TABLE II

CATALYST SUMMARY

| PATCH # | CATALYST | OZONE CONVERSION (%) |
|---|---|---|
| 1 | $Pt/Al_2O_3$<br>0.67 g/in³ (23 g/ft³ Pt)<br>No Precoat<br>No Calcine (120° C. only) | 12 |
| 2 | $Pd/Mn/Al_2O_3$<br>0.97 g/in³ (171 g/ft³ Pd)<br>No Precoat<br>Calcined 450° C. | 25 |
| 3 | $Pd/Mn/Al_2O_3$<br>1.19 g/in³ (209 g/ft³ Pd)<br>$SiO_2/Al_2O_3$ Precoat (0.16 g/in³)<br>Calcined 450° C. | 24 |
| 4 | $Pt/Al_2O_3$<br>0.79 g/in³ (27 g/ft³ Pt)<br>No Precoat<br>Calcined 450° C. | 8 |
| 5 | Carulite 200<br>0.49 g/in³<br>3% $SiO_2/Al_2O_3$ Binder<br>No Precoat<br>Calcined 400° C. | 50 |
| 6 | $Pd/Mn/Al_2O_3$<br>0.39 g/in³ (70 g/ft³ Pd)<br>No Precoat<br>Calcined 450° C. | 28 |
| 7 | I.W. $Pd/Mn/Al_2O_3$<br>0.69 g/in³ (95 g/ft³ Pd)<br>No Precoat<br>No Calcine (120° C. only) | 50 |
| 8 | Carbon<br>0.80 g/in³<br>No Precoat<br>No Calcine (120° C. only) | 22 |
| 9 | Cantlite 200<br>0.65 g/in³<br>3% $SiO_2/Al_2O_3$ Binder<br>$Al_2O_3$ Precoat (0.25 g/in³)<br>Calcined 450° C. | 38 |
| 10 | Carulite 200<br>0.70 g/in³<br>2% Latex Binder<br>No Precoat<br>No Calcine (120° C. only) | 42 |
| 11 | I.W. $Pd/Mn/Al_2O_3$<br>0.59 g/in³ (82 g/ft³ Pd)<br>$SiO_2/Al_2O_3$ precoat (0.59 g/in³)<br>No Calcine either Coat (120° C. only) | 46 |
| 12 | Carbon<br>1.07 g/in³<br>$Al_2O_3$ Precoat (0.52 g/in³ calcined to 450° C.<br>Topcoat not calcined (120° C. only) | 17 |

EXAMPLE 5

100 g of Versal GL alumina obtained from LaRoche Industries Inc. was impregnated with about 28 g of Pt amine hydroxide (Pt(A)salt) diluted in water to about 80 g of solution. 5 g of acetic acid was added to fix the Pt onto the alumina surface. After mixing for half hour, the Pt impregnated catalyst was made into a slurry by adding water to make about 40% solids. The slurry was ballmilled for 2 hours. The particle size was measured to be 90% less than 10 microns. The catalyst was coated onto a 1.5" diameter by 1.0" length 400 cpsi ceramic substrate to give a washcoat loading after drying of about 0.65 g/in³. The catalyst was then dried at 100° C. and calcined at 550° C. for 2 hours. This catalyst was tested for $C_3H_6$ oxidation at temperatures between 60 and 100° C in dry air as described in Example 8.

Some of calcined $Pt/Al_2O_3$ sample described above was also reduced in 7%H2/N2 at 400° C. for 1 hour. The reduction step was carried out by ramping the catalyst temperature from 25 to 400° C. at a H2/N2 gas flow rate of 500 cc/min. The ramp temperature was about 5° C./min. The catalyst was cooled down to room temperature and the catalyst was tested for $C_3H_6$ oxidation as described in Example 8.

EXAMPLE 6

6.8 g of ammonium tungstate was dissolved in 30 cc of water and the pH adjusted to 10 and the solution impregnated onto 50 g of Versal GL alumina (LaRoche Industries Inc.). The material was dried at 100° C. and calcined for 2 hours at 550° C. The approximately 10% by metal weight of W on $Al_2O_3$ was cooled to room temperature and impregnated with 13.7 g of Pt amine hydroxide (18.3% Pt). 2.5 g of acetic acid was added and mixed well. The catalyst was then made into a slurry containing 35% solid by adding water. The slurry was then coated over a 400 cpsi, 1.5"× 1.01" diameter ceramic substrate resulting, after drying, in having a catalyst washcoat loading of 0.79 g/in³. The coated catalyst was then dried and calcined at 550° C. for 2 hours. The catalyst was tested calcined in $C_3H_6$ and dry air in the temperature range 60 to 100° C.

EXAMPLE 7

6.8 g of perrhenic acid (36% Re in solution) was further diluted in water to make 10 g percent perrhenic acid solution. The solution was impregnated onto 25 g of Versal GL alumina. The impregnated alumina was dried and the powder calcined at 550° C. for 2 hours. The impregnated 10 weight percent based metal of Re on $Al_2O_3$ powder was then further impregnated with 6.85 g of Pt amine hydroxide solution (Pt metal in solution was 18.3%). 5 g of acetic acid was added and mixed for a half hour. A slurry was made by adding water to make 28% solid. The slurry was ballmilled for 2 hours and coated onto 1.5" diameter×1.0" length 400 cpsi ceramic substrate to give a catalyst washcoat loading of 0.51 g/in³ after drying. The catalyst coated substrate was dried at 100° C. and calcined at 550° C. for 2 hours. The catalyst was tested in the calcined form using 60 ppm $C_3H_6$ and dry air in the temperature range of 60 to 100° C.

EXAMPLE 8

The catalyst of Examples 5, 6 and 7 were tested in a microreactor. The size of the catalyst samples was 0.5" diameter and 0.4" length. The feed was composed of 60 ppm $C_3H_6$ in dry air in the temperature range of 25 to 100° C. The $C_3H_6$ was measured at 60, 70, 80, 90 and 100° C. at steady sate condition. Results are summarized in Table III.

TABLE III

SUMMARY RESULTS OF C3H6 CONVERSION

| Catalyst Name | $Pt/Al_2O_3$ Calcined (Ex. 18) | $Pt/Al_2O_3$ Calcined and Reduced (Ex. 18) | Pt/10% $W/Al_2O_3$ Calcined (Ex. 19) | Pt/10% $Re/Al_2O_3$ Calcined (Ex. 20) |
|---|---|---|---|---|
| % C3H6 Conversion @ | | | | |
| 60° C. | 0 | 10 | 9 | 11 |
| 70° C. | 7 | 22 | 17 | 27 |
| 80° C. | 20 | 50 | 39 | 45 |
| 90° C. | 38 | 70 | 65 | 64 |
| 100° C. | 60 | 83 | 82 | 83 |

It is clear from the Table that addition of W or Re oxide has enhanced the activity of the $Pt/Al_2O_3$ in the calcined form. The $C_3H_6$ conversion of the calcined $Pt/Al_2O_3$ was enhanced significantly when catalyst was reduced at 400° C. for 1 hour. The enhanced activity was also observed for the calcined catalyst by incorporation of W or Re oxides.

EXAMPLE 9

This is an example of preparing high surface area cryptomelane using $MnSO_4$.

Molar ratios:$KMnO_4$:$MnSO_4$:acetic acid were 1:1.43:5.72

Molarities of Mn in solutions prior to mixing were:
0.44 M $KMnO_4$
0.50 M $MnSO_4$
FW $KMnO_4$=158.04 g/mol
FW $MnSO_4 \cdot H_2O$=169.01 g/mol
FW $C_2H_4O_2$=60.0 g/mol
The following steps were conducted:
1. Made a solution of 3.50 moles (553 grams) of $KMnO_4$ in 8.05 L of D.I. water and heated to 68° C.
2. Made 10.5 L of 2N acetic acid by using 1260 grams of glacial acetic acid and diluting to 10.5 L with D.I. water. Density of this solution is 1.01 g/mL.
3. Weighed out 5.00 moles (846 grams) of manganous sulfate hydrate ($MnSO_4 \cdot H_2O$) and dissolved in 10,115 g of the above 2N acetic acid solution and heated to 40° C.
4. Added the solution from 3. to the solution from 1. over 15 minutes while continuously stirring. After addition was complete, began heating the slurry according to the following heat-up rate:
1:06 pm 69.4° C.
1:07 pm 71.2° C.
1:11 pm 74.5° C.
1:15 pm 77.3° C.
1:18 pm 80.2° C.
1:23 pm 83.9° C.
1:25 pm 86.7° C.
1:28 pm 88.9° C.
5. At 1:28 pm approximately 100 mL of slurry was removed from the vessel and promptly filtered on a Buchner funnel, washed with 2 L of D.I. water, and then dried in an oven at 100° C. The sample was determined to have a BET Multi-Point surface area of 259.5 $m^2$/g and Matrix (T-Plot) surface area of 254.1 $m^2$/g.

EXAMPLE 10

This is an example of preparing high surface area cryptomelane using $Mn(CH_3COO)_2$.

Molar ratios: $KMnO_4$:$Mn(CH_3CO_2)_2$:acetic acid were 1:1.43:5.72

FW $KMnO_4$=158.04 g/mol Aldrich Lot #08824MG

FW $Mn(CH_3CO_2)_2 \cdot H_2O$=245.09 g/mol Aldrich Lot #08722HG

FW $C_2H_4O_2$=60.0 g/mol
1. Made a solution of 2.0 moles (316 grams) of $KMnO_4$ in 4.6 L of D.I. water and heated to 60° C. by heating on hot plates.
2. Made up 6.0 of 2N acetic acid by using 720 grams of glacial acetic acid and diluting to 6.0 L with D.I. water. Density of this solution is 1.01 g/mL.
3. Weighed out 2.86 moles (700 grams) of manganese (II) acetate tetrahydrate [$Mn(CH_3CO_2)_2 \cdot 4H_2O$] and dissolved in 5780 g of the above 2N acetic acid solution (in the reactor vessel). Heated to 60° C. in the reactor vessel.
4. Added the solution from 1. to the solution from 3. while maintaining the slurry at 62–63° C. After complete addition, gently heated the slurry according to the following:
82.0° C. at 3:58 pm
86.5° C. at 4:02 pm
87.0° C. at 4:06 pm
87.1° C. at 4:08 pm
shut off heat
then quenched the slurry by pumping 10 L of D.I. water into the vessel. This cooled the slurry to 58° C at 4:13 pm.
The slurry was filtered on Buchner funnels. The resulting filter cakes were reslurried in 12 L of D.I. water then stirred overnight in a 5 gallon bucket using a mechanical stirrer. The washed product was refiltered in the morning then dried in an oven at 100° C. The sample was determined to have a BET Multi-Point surface area of 296.4 $m^2$/g and Matrix (T-Plot) surface area of 267.3 $m^2$/g.

The resulting cryptomelane is characterized by the XRD pattern of FIG. 20. It is expected to have an IR spectrum similar to that shown in FIG. 19.

EXAMPLE 11

Following is a description of the ozone testing method for determining percent ozone decomposition used in this Example. A test apparatus comprising an ozone generator, gas flow control equipment, water bubbler, chilled mirror dew point hygrometer, and ozone detector was used to measure the percent ozone destroyed by catalyst samples. Ozone was generated in situ utilizing the ozone generator in a flowing gas stream comprised of air and water vapor. The ozone concentration was measured using the ozone detector and the water content was determined utilizing the dew point hygrometer. Samples were tested as 25° C. using inlet ozone concentrations of 4.5 to 7 parts per million (ppm) in a gas stream flowing at approximately 1.5 L/minute with a dew point between 15° C. and 17° C. Samples were tested as particles sized to −25/+45 mesh held between glass wool plugs in a ¼" I.D. Pyrex® glass tube. Tested samples filled a 1 cm portion of the glass tube.

Sample testing generally required between 2 to 16 hours to achieve a steady state of conversion. Samples typically gave close to 100% conversion when testing began and slowly decreased to a "leveled off" conversation that remained steady for extended periods of time (48 hours). After a steady state was obtained, conversions were calculated from the equation: % ozone conversion =[(1−(ozone concentration after passing over catalyst)/(ozone concentration before passing over catalyst)]*100.

Ozone destruction testing on the sample of Example 9 showed 58% conversion.

Ozone destruction testing on the sample of Example 10 showed 85% conversion.

EXAMPLE 12

This example is intended to illustrate that the method of Example 10 generated "clean" high surface area cryptomelane for which the ozone destruction performance was not further enhanced by calcination and washing. A 20 gram portion of the sample represented by Example 10 was calcined in air at 200° C. for 1 hour, cooled to room temperature, then washed at 100° C. in 200 mL of D.I. water by stirring the slurry for 30 minutes. The resulting product was filtered and dried at 100° C. in an oven. The sample was determined to have BET Multi-Point surface area of 265 $m^2/g$. Ozone destruction testing on the sample showed 85% conversion. A comparison to the testing of the sample of Example 10 demonstrated that no benefit in ozone conversion was realized from the washing and calcination of the sample of Example 10.

EXAMPLE 13

Samples of high surface area cryptomelane were obtained from commercial suppliers and modified by calcination and/or washing. As received and modified powders were tested for ozone decomposition performance according to the method of Example 11 and characterized by powder X-ray diffraction, infrared spectroscopy, and BET surface area measurements by nitrogen adsorption.

EXAMPLE 13a

A commercially supplied sample of high surface area cryptomelane (Chemetals, Inc., Baltimore, Md.) was washed for 30 minutes in D.I. water at 60° C., filtered, rinsed, and oven-dried at 100° C. Ozone conversion of the as received sample was 64% compared to 79% for the washed material. Washing did not change the surface area or crystal structure of this material (223 $m^2/g$ cryptomelane) as determined by nitrogen adsorption and powder X-ray diffraction measurements, respectively. However, infrared spectroscopy showed the disappearance of peaks at 1220 and 1320 wavenumbers in the spectrum of the washed sample indicating the removal of sulfate group anions.

EXAMPLE 13b

Commercially supplied samples of high surface area cryptomelane (Chemetals, Inc., Baltimore, Md.) were calcined at 300° C. for 4 hours and 400° C. for 8 hours. Ozone conversion of the as received material was 44% compared to 71% for the 300° C. calcined sample and 75% for the 400° C. calcined sample. Calcination did not significantly change the surface area or crystal structure of the 300° C. or 400° C. samples (334 $m^2/g$ cryptomelane). A trace of $Mn_2O_3$ was detected in the 400° C. sample. Calcination causes dehydroxylation of these samples. Infrared spectroscopy show a decrease in the intensity of the band between 2700 and 3700 wavenumbers assigned to surface hydroxyl groups.

EXAMPLE 14

The addition Pd black (containing Pd metal and oxide) to high surface area cryptomelane is found to significantly enhance ozone decomposition performance. Samples were prepared comprising Pd black powder physically mixed with powders of (1) a commercially obtained cryptomelane (the 300° C. calcined sample described in Example 13b) and (2) the high surface area cryptomelane synthesized in Example 10 calcined at 200° C. for 1 hour. The samples were prepared by mixing, in a dry state, powder of Pd black and cryptomelane in a 1:4 proportion by weight. The dry mixture was shaken until homogeneous in color. An amount of D.I. water was added to the mixture in a beaker to yield 20–30% solids content, thus forming a suspension. Aggregates in the suspension were broken up mechanically with a stirring rod. The suspension was sonicated in a Bransonic® Model 5210 ultrasonic cleaner for 10 minutes and then oven dried at 120–140° C. for approximately 8 hours.

The ozone conversion for the commercially obtained cryptomelane calcined at 300° C. was 71% as measured on the powder reactor (Example 13b). A sample of this product was mixed with 20 weight percent Pd black yielded 88% conversion.

The cryptomelane sample prepared as in Example 10 calcined at 200° C. had 85% conversion. Performance improved to 97% with 20 weight percent Pd black added.

What is claimed is:

1. A method for treating the atmosphere comprising the steps of:
    (a) sensing the presence of pollutants in outside ambient air with a pollutant sensing means to generate a signal;
    (b) providing means for treatment of the outside ambient air based on the signal, wherein the means for treatment of the ambient air comprises:
        i) a non-airborne substrate selected from the group consisting of outside heat exchanger coils and outside components of air conditioning systems;
        ii) the substrate having at least one ambient air contacting surface with a pollution treating composition thereon and a means for drawing the outside ambient air into contact with the surface containing the pollution treating composition;
    (c) activates the means for drawing the outside ambient air into contact with the surface containing the pollution treating composition for converting the pollutants into non-polluting compounds based on the signal to treat the atmosphere; and
    (d) drawing the ambient stir into contact with the surface containing the pollution treating composition.

2. The method of claim 1 wherein the sensing means comprises a first signal generating means for generating a signal corresponding to the concentration of the pollutant in the ambient air, comparing means for comparing the first signal to a second signal corresponding to a predetermined concentration of the pollutant, and transmitting means for transmitting a third signal to a power source to activate the ambient air passing means to enable the ambient air to contact the pollutant treating composition when the first signal exceeds the second signal.

3. The apparatus of claim 2 wherein the power source is a solar cell.

4. The method of claim 1 wherein a first signal generator means as positioned at a location remote from the substrate for generating the signal for activating the means for drawing the outside ambient air, and a receiving means positioned at a location proximate to the substrate for receiving the signal and for activating the means for drawing the outside ambient air.

5. The method of claim 1, wherein the pollutant treating composition is at least one composition selected from the group consisting of a catalyst composition and an adsorption composition.

6. The method of claim 5, wherein the pollutant treating composition is selected from the group consisting of precious metals and manganese components.

7. The method of claim 6, wherein the precious metals are selected from the group consisting of platinum and palladium and the manganese component is manganese oxide.

8. The method of claim 7, wherein the precious metal is supported on at least one refractory oxide selected from the group consisting of silica, alumina, titania, ceria, zirconia, and chromia.

9. The method of claim 1, wherein the pollutant treating composition is at least one composition selected from the group consisting of a catalyst composition and an adsorption composition.

10. The method of claim 9, wherein the pollutant treating composition is selected from the group consisting of precious metals and manganese components.

11. The method of claim 10, wherein the precious metals are selected from the group consisting of platinum and palladium and the manganese component is manganese oxide.

12. The method of claim 11, wherein the precious metal is supported on at least one refractory oxide selected from the group consisting of silica, alumina, titania, ceria, zirconia, and chromia.

13. The method of claim 12, wherein the precious metal is platinum.

14. A method for treating earth's atmosphere comprising the steps of:

a) sensing the presence of pollutants in the atmosphere with a pollutant sensing means to generate a signal;

b) signaling an air drawing device of a motor vehicle, the motor vehicle further comprising at least one ambient air contacting surface with a pollution treating composition thereon, and wherein the motor vehicle is selected from the group consisting of automobiles, trucks, trains, boats, ships and motorcycles;

c) drawing ambient air into contact with the ambient air contacting surface containing the pollution treating composition for converting the pollutants into non-polluting compounds based on the signal to treat the atmosphere; and d) maintaining the motor vehicle at rest with its engine off.

15. The method of claim 14, wherein the contacting surface is selected from the group consisting of radiators, fan blades, air conditioning condensers, air charge coolers, engine oil coolers, transmission oil coolers, and wind deflectors.

16. The method of claim 15, wherein the motor vehicle is an automobile and the air contacting surface is a radiator.

17. The method of claim 14 wherein the ambient air is drawn with a fan.

18. The method of claim 15, wherein the pollutant treating composition is at least one composition selected from the group consisting of a catalyst composition and an adsorption composition.

19. The method of claim 16, wherein the pollutant treating composition is selected from the group consisting of precious metals and manganese components.

20. The method of claim 17, wherein the precious metals are selected from the group consisting of platinum and palladium and the manganese component is manganese oxide.

21. The method of claim 18, wherein the precious metal is supported on at least one refractory oxide selected from the group consisting of silica, alumina, titania, ceria, zirconia, and chromia.

22. The method of claim 19, wherein the precious metal is platinum.

* * * * *